(12) United States Patent
Liu et al.

(10) Patent No.: US 11,640,605 B2
(45) Date of Patent: *May 2, 2023

(54) METHOD, SERVER, AND STORAGE MEDIUM FOR VERIFYING TRANSACTIONS USING A SMART CARD

(71) Applicant: TENCENT TECHNOLOGY (SHENZHEN) COMPANY LIMITED, Shenzhen (CN)

(72) Inventors: Kai Liu, Shenzhen (CN); Yaxuan Zhu, Shenzhen (CN); Runda Cai, Shenzhen (CN); Zhenyu Xu, Shenzhen (CN); Chenglin Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 281 days.

This patent is subject to a terminal disclaimer.

(21) Appl. No.: 17/101,295

(22) Filed: Nov. 23, 2020

(65) Prior Publication Data

US 2021/0073809 A1    Mar. 11, 2021

Related U.S. Application Data

(63) Continuation of application No. 15/177,413, filed on Jun. 9, 2016, now Pat. No. 10,878,413, which is a (Continued)

(30) Foreign Application Priority Data

Jan. 7, 2014 (CN) .......................... 201410006083.5

(51) Int. Cl.
*G06Q 20/38* (2012.01)
*G06F 21/34* (2013.01)
(Continued)

(52) U.S. Cl.
CPC ......... *G06Q 20/3829* (2013.01); *G06F 21/34* (2013.01); *G06K 19/06037* (2013.01);
(Continued)

(58) Field of Classification Search
None
See application file for complete search history.

(56) References Cited

U.S. PATENT DOCUMENTS 5,036,461 A * 7/1991 Elliott .................... G06Q 20/40
                                                              713/172
5,065,429 A * 11/1991 Lang ....................... G06F 21/80
                                                              713/184
(Continued)

FOREIGN PATENT DOCUMENTS

CN    02197407    9/2011
CN    02842081    12/2012
(Continued)

OTHER PUBLICATIONS

Setyoko (Multipurpose Smart Card System) (Year: 2014).*
(Continued)

*Primary Examiner* — Mamon Obeid
(74) *Attorney, Agent, or Firm* — Crowell & Moring LLP

(57) ABSTRACT

A method, server and storage medium for verifying a transaction using a smart card are disclosed. A server receives a transaction request to perform a transaction with a user of the smart card. The transaction request includes identification information and encrypted data extracted from the smart card, and transaction information. The server determines a user account linked to the identification information. The server performs a first verification process to authenticate the smart card by verifying that the smart card possesses a correct decryption key corresponding to the identification information. The server performs a second (Continued)

verification process to authenticate the smart card by verifying that the encrypted data extracted from the smart card encodes stored data corresponding to the respective user account linked to the identification information. If the first and the second verification processes are successful, the server processes the transaction in accordance with the transaction information.

20 Claims, 13 Drawing Sheets

Related U.S. Application Data continuation of application No. PCT/CN2015/070230, filed on Jan. 6, 2015.

(51) Int. Cl.
G06Q 20/40 (2012.01)
G06K 19/06 (2006.01)

(52) U.S. Cl.
CPC ... *G06K 19/06112* (2013.01); *G06Q 20/3821* (2013.01); *G06Q 20/4015* (2020.05)

(56) References Cited

U.S. PATENT DOCUMENTS

| | | | | |
|---|---|---|---|---|
| 5,191,611 | A * | 3/1993 | Lang | G07C 9/33 713/184 |
| 5,225,664 | A * | 7/1993 | Iijima | G06F 21/34 235/382 |
| 5,282,249 | A * | 1/1994 | Cohen | H04N 7/163 235/382 |
| 5,923,759 | A * | 7/1999 | Lee | G06Q 20/204 340/5.1 |
| 5,949,044 | A * | 9/1999 | Walker | G06Q 40/00 705/64 |
| 6,018,717 | A * | 1/2000 | Lee | G07F 7/0866 705/13 |
| 6,301,660 | B1 * | 10/2001 | Benson | G06F 21/10 380/280 |
| 6,829,711 | B1 * | 12/2004 | Kwok | G06F 21/445 713/176 |
| 7,028,014 | B1 * | 4/2006 | Naclerio | G07B 17/00193 705/401 |
| 7,103,575 | B1 * | 9/2006 | Linehan | G06Q 30/0601 705/26.1 |
| 7,258,267 | B2 * | 8/2007 | Choi | G06Q 20/40 235/375 |
| 7,357,309 | B2 * | 4/2008 | Ghosh | G06Q 30/0601 705/41 |
| 7,373,517 | B1 * | 5/2008 | Riggins | H04L 9/0863 713/168 |
| 7,395,435 | B2 * | 7/2008 | Benhammou | H04L 9/0643 713/168 |
| 7,426,277 | B2 * | 9/2008 | Kimura | G06Q 20/388 380/278 |
| 7,536,722 | B1 * | 5/2009 | Saltz | G06F 21/33 726/20 |
| 7,599,856 | B2 * | 10/2009 | Agrawal | G06Q 20/401 705/76 |
| 7,627,531 | B2 * | 12/2009 | Breck | G07C 9/28 705/65 |
| 7,681,232 | B2 * | 3/2010 | Nordentoft | G07F 7/1008 726/20 |
| 7,779,455 | B2 * | 8/2010 | Abellan Sevilla | H04N 21/4181 726/6 |
| 7,983,419 | B2 * | 7/2011 | Fan | H04L 63/04 380/255 |
| 8,042,155 | B1 * | 10/2011 | Chang | H04L 63/0853 713/168 |
| 8,234,504 | B2 * | 7/2012 | Cheung | H04L 9/0894 713/189 |
| 8,239,324 | B2 * | 8/2012 | Asai | G07F 7/1008 705/41 |
| 8,355,982 | B2 * | 1/2013 | Hazel | G07G 3/003 705/38 |
| 8,364,808 | B2 * | 1/2013 | Shima | H04L 63/123 713/192 |
| 8,539,233 | B2 * | 9/2013 | Dubhashi | H04L 9/0816 713/168 |
| 8,606,720 | B1 * | 12/2013 | Baker | G06Q 20/3674 705/64 |
| 8,787,973 | B2 * | 7/2014 | Agami | H04W 12/068 455/410 |
| 8,966,581 | B1 * | 2/2015 | Gross | G06F 21/34 726/4 |
| 9,060,057 | B1 * | 6/2015 | Danis | H04L 63/083 |
| 9,547,861 | B2 * | 1/2017 | Itwaru | G06Q 20/352 |
| 9,560,010 | B1 * | 1/2017 | Estes | H04L 63/123 |
| 9,628,273 | B2 * | 4/2017 | Alshammari | H04L 63/0457 |
| 9,760,645 | B1 * | 9/2017 | Park | G06K 19/06037 |
| 9,915,943 | B2 * | 3/2018 | Wang | G05B 19/4189 |
| 10,326,797 | B1 * | 6/2019 | Murray | H04L 9/0825 |
| 10,475,024 | B1 * | 11/2019 | Behren | G06Q 20/204 |
| 10,535,044 | B2 * | 1/2020 | Feldman | G06Q 20/10 |
| 10,614,454 | B1 * | 4/2020 | Brooks, V | H04L 63/105 |
| 10,769,624 | B1 * | 9/2020 | Gonzalez | G06Q 20/3672 |
| 10,878,413 | B2 * | 12/2020 | Liu | G06F 21/34 |
| 11,037,139 | B1 * | 6/2021 | Ho | G06Q 20/3263 |
| 11,257,085 | B1 * | 2/2022 | Barkas | G06Q 20/401 |
| 11,386,424 | B2 * | 7/2022 | Dicker | G06Q 20/10 |
| 11,423,374 | B2 * | 8/2022 | Hardin | H04L 67/02 |
| 2001/0045451 | A1 * | 11/2001 | Tan | G06Q 20/12 235/375 |
| 2002/0013898 | A1 * | 1/2002 | Sudia | G06Q 20/3829 380/278 |
| 2002/0049729 | A1 * | 4/2002 | Umekawa | G07F 17/16 |
| 2002/0076204 | A1 * | 6/2002 | Nakano | G11B 20/00086 360/60 |
| 2002/0077837 | A1 * | 6/2002 | Krueger | G06Q 20/02 705/39 |
| 2002/0107809 | A1 * | 8/2002 | Biddle | G06F 21/10 705/59 |
| 2002/0128977 | A1 * | 9/2002 | Nambiar | G06Q 20/382 705/64 |
| 2002/0129250 | A1 * | 9/2002 | Kimura | G06Q 20/40975 713/168 |
| 2002/0152178 | A1 * | 10/2002 | Lee | G06Q 20/3674 705/67 |
| 2003/0009681 | A1 * | 1/2003 | Harada | G11B 20/00086 713/168 |
| 2003/0028481 | A1 * | 2/2003 | Flitcroft | G07F 7/12 705/39 |
| 2003/0093680 | A1 * | 5/2003 | Astley | G06F 21/445 713/183 |
| 2003/0111526 | A1 * | 6/2003 | Smith | G06Q 20/0425 235/379 |
| 2003/0145205 | A1 * | 7/2003 | Sarcanin | G06Q 20/3821 713/172 |
| 2003/0172273 | A1 * | 9/2003 | Hans | G06Q 20/4014 713/172 |
| 2003/0187805 | A1 * | 10/2003 | Shen | H04L 63/045 705/80 |
| 2003/0229795 | A1 * | 12/2003 | Kunigkeit | G06F 21/87 713/189 |
| 2004/0033813 | A1 * | 2/2004 | Sakamura | G06Q 20/341 455/515 |
| 2004/0034784 | A1 * | 2/2004 | Fedronic | G07F 7/1025 713/186 |
| 2004/0059685 | A1 * | 3/2004 | Sakamura | G06Q 20/3678 705/65 |
| 2004/0118914 | A1 * | 6/2004 | Smith | H04M 17/10 235/380 |
| 2004/0127256 | A1 * | 7/2004 | Goldthwaite | G06K 7/0073 455/466 |

(56) References Cited

U.S. PATENT DOCUMENTS

| | | | |
|---|---|---|---|
| 2004/0168063 A1* | 8/2004 | Revital | H04N 21/4623 713/172 |
| 2004/0218214 A1* | 11/2004 | Kihara | G06F 21/31 358/1.14 |
| 2004/0236819 A1* | 11/2004 | Anati | H04L 63/0853 709/200 |
| 2004/0250066 A1* | 12/2004 | Di Luoffo | G06Q 20/4097 713/168 |
| 2005/0044385 A1* | 2/2005 | Holdsworth | G06Q 20/40 713/185 |
| 2005/0050366 A1* | 3/2005 | Kwok | G06F 21/34 726/19 |
| 2005/0138390 A1* | 6/2005 | Adams | G06F 1/1656 713/185 |
| 2005/0150945 A1* | 7/2005 | Choi | G06Q 20/108 235/379 |
| 2005/0165684 A1* | 7/2005 | Jensen | G06Q 20/425 705/44 |
| 2005/0188167 A1* | 8/2005 | Squibbs | G06F 21/31 711/163 |
| 2005/0195975 A1* | 9/2005 | Kawakita | H04L 9/3236 380/30 |
| 2005/0240779 A1* | 10/2005 | Aull | H04L 9/32 713/186 |
| 2006/0032905 A1* | 2/2006 | Bear | G06K 7/0008 235/380 |
| 2006/0049256 A1* | 3/2006 | von Mueller | G06Q 20/3552 705/64 |
| 2006/0161490 A1* | 7/2006 | Chakiris | G06Q 20/204 705/35 |
| 2006/0271483 A1* | 11/2006 | Ernst | H04N 21/63345 348/E7.063 |
| 2007/0011066 A1* | 1/2007 | Steeves | G06Q 20/3829 705/35 |
| 2007/0192584 A1* | 8/2007 | Bajar | H04L 63/0428 713/150 |
| 2007/0198848 A1* | 8/2007 | Bjorn | G07C 9/28 713/186 |
| 2008/0003977 A1* | 1/2008 | Chakiris | G06Q 20/322 455/407 |
| 2008/0052770 A1* | 2/2008 | Ali | G07F 7/1008 726/14 |
| 2008/0061150 A1* | 3/2008 | Phillips | G06K 19/07769 705/41 |
| 2008/0061151 A1* | 3/2008 | Phillips | G06K 19/07716 235/492 |
| 2008/0068181 A1* | 3/2008 | Phillips | G06K 19/07762 340/572.7 |
| 2008/0091944 A1* | 4/2008 | von Mueller | G06Q 20/12 713/168 |
| 2008/0104392 A1* | 5/2008 | Satoshi | H04L 9/0891 713/164 |
| 2008/0121707 A1* | 5/2008 | Phillips | G06K 19/07769 235/492 |
| 2008/0134346 A1* | 6/2008 | Cho | G06Q 20/02 726/29 |
| 2008/0165006 A1* | 7/2008 | Phillips | G07F 7/0806 340/572.1 |
| 2008/0165959 A1* | 7/2008 | Hong | G11B 20/00086 380/278 |
| 2008/0179401 A1* | 7/2008 | Hart | G07F 7/0813 235/449 |
| 2008/0201265 A1* | 8/2008 | Hewton | G06Q 20/40145 235/492 |
| 2009/0076966 A1* | 3/2009 | Bishop | G06Q 20/363 705/67 |
| 2009/0121029 A1* | 5/2009 | Asnaashari | G06F 21/79 235/492 |
| 2009/0125719 A1* | 5/2009 | Cochran | G06Q 30/02 713/171 |
| 2009/0144205 A1* | 6/2009 | Hurry | H04N 21/42684 705/44 |
| 2009/0235339 A1* | 9/2009 | Mennes | H04L 9/3273 726/5 |
| 2009/0254971 A1* | 10/2009 | Herz | G06Q 30/0603 726/1 |
| 2009/0256676 A1* | 10/2009 | Piccirillo | G07C 9/00309 340/5.65 |
| 2009/0285397 A1* | 11/2009 | Iwamori | H04L 9/3273 380/277 |
| 2010/0057616 A1* | 3/2010 | Kapur | G06Q 20/3224 705/44 |
| 2010/0057618 A1* | 3/2010 | Spicer | G06Q 40/06 715/848 |
| 2010/0088237 A1* | 4/2010 | Wankmueller | G06Q 20/382 705/64 |
| 2010/0100724 A1* | 4/2010 | Kaliski, Jr. | H04L 9/3226 713/171 |
| 2010/0153717 A1* | 6/2010 | Sandler | G06F 21/51 713/168 |
| 2010/0185875 A1* | 7/2010 | Mayer | G06Q 10/10 726/19 |
| 2010/0199089 A1* | 8/2010 | Vysogorets | G06F 21/34 713/168 |
| 2010/0239093 A1* | 9/2010 | Hotta | G06F 21/35 358/1.14 |
| 2010/0241867 A1* | 9/2010 | Brown | G06Q 20/40975 713/185 |
| 2010/0257101 A1* | 10/2010 | Fierro | G06Q 20/3823 705/64 |
| 2011/0106710 A1* | 5/2011 | Reed | H04L 9/3226 705/44 |
| 2011/0173124 A1* | 7/2011 | Feldman | G06Q 20/401 713/168 |
| 2011/0246791 A1* | 10/2011 | Kambayashi | G06F 12/1408 713/193 |
| 2011/0258452 A1* | 10/2011 | Coulier | H04L 9/3242 713/171 |
| 2011/0270751 A1* | 11/2011 | Csinger | G06F 21/40 705/42 |
| 2011/0307724 A1* | 12/2011 | Shaw | G06F 21/34 713/323 |
| 2012/0130794 A1* | 5/2012 | Strieder | G06Q 30/0226 705/14.27 |
| 2012/0159196 A1* | 6/2012 | Kuno | H04L 9/16 713/193 |
| 2012/0233456 A1* | 9/2012 | Spitz | G06F 21/34 713/155 |
| 2012/0239417 A1* | 9/2012 | Pourfallah | G06Q 30/0601 705/2 |
| 2012/0317410 A1* | 12/2012 | Paulsen | H04L 9/14 713/153 |
| 2012/0323717 A1* | 12/2012 | Kirsch | G06Q 20/3829 705/26.1 |
| 2013/0080769 A1* | 3/2013 | Cha | H04L 67/02 726/3 |
| 2013/0097419 A1* | 4/2013 | Lu | H04L 9/08 713/155 |
| 2013/0185354 A1* | 7/2013 | Seligstein | G06Q 20/20 709/204 |
| 2013/0218769 A1* | 8/2013 | Pourfallah | G06Q 20/10 705/44 |
| 2013/0226609 A1* | 8/2013 | Pourfallah | G06Q 10/10 705/2 |
| 2013/0257590 A1* | 10/2013 | Kuenzi | G05B 1/01 340/5.65 |
| 2013/0268443 A1* | 10/2013 | Petrov | G06Q 20/367 705/64 |
| 2013/0283040 A1* | 10/2013 | Tu | H04W 4/60 726/5 |
| 2013/0283049 A1* | 10/2013 | Brown | G06F 21/86 713/165 |
| 2013/0290714 A1* | 10/2013 | Hans | H04L 9/3273 713/168 |
| 2013/0311313 A1* | 11/2013 | Laracey | G06Q 20/3278 705/16 |
| 2013/0339167 A1* | 12/2013 | Taylor | G06Q 20/387 705/21 |

(56) References Cited

U.S. PATENT DOCUMENTS

| | | | | |
|---|---|---|---|---|
| 2014/0032409 | A1* | 1/2014 | Rosano | G06Q 20/401 705/44 |
| 2014/0046746 | A1* | 2/2014 | Davis | G06Q 20/351 705/41 |
| 2014/0047703 | A1* | 2/2014 | Forster | G06K 19/07718 29/601 |
| 2014/0054382 | A1* | 2/2014 | Sugibuchi | G06K 19/073 235/492 |
| 2014/0058855 | A1* | 2/2014 | Hussein | G06Q 20/321 705/16 |
| 2014/0081874 | A1* | 3/2014 | Lewis | G07F 19/202 705/72 |
| 2014/0164774 | A1* | 6/2014 | Nord | H04L 9/12 713/171 |
| 2014/0189359 | A1* | 7/2014 | Marien | H04L 9/3228 713/172 |
| 2014/0244494 | A1* | 8/2014 | Davis | G06Q 20/36 705/41 |
| 2014/0258132 | A1* | 9/2014 | Swamy | G06Q 20/3278 705/67 |
| 2014/0263622 | A1* | 9/2014 | Babatz | G06Q 20/34 235/380 |
| 2014/0317410 | A1* | 10/2014 | Yamaguchi | H04L 63/08 726/4 |
| 2014/0359144 | A1* | 12/2014 | Kruse | H04L 65/1104 709/228 |
| 2015/0012430 | A1* | 1/2015 | Chisholm | G06Q 20/34 705/44 |
| 2015/0032622 | A1* | 1/2015 | Powell | G06Q 20/407 705/44 |
| 2015/0039506 | A1* | 2/2015 | Groarke | G06Q 20/02 705/44 |
| 2015/0072653 | A1* | 3/2015 | Fan | H04W 12/06 455/411 |
| 2015/0088756 | A1* | 3/2015 | Makhotin | G06Q 20/326 705/71 |
| 2015/0095219 | A1* | 4/2015 | Hurley | G06Q 20/382 705/39 |
| 2015/0120419 | A1* | 4/2015 | Byland | G06Q 30/0223 705/14.24 |
| 2015/0140957 | A1* | 5/2015 | Kiswani | G06Q 20/348 455/406 |
| 2015/0149776 | A1* | 5/2015 | Chastain | H04L 63/061 713/168 |
| 2015/0264091 | A1* | 9/2015 | Lin | H04L 67/12 709/228 |
| 2015/0301802 | A1* | 10/2015 | Katoh | G06F 7/588 708/190 |
| 2015/0302410 | A1* | 10/2015 | Lacoss-Arnold | G06Q 20/354 705/35 |
| 2015/0332258 | A1* | 11/2015 | Kurabi | G06Q 20/382 705/71 |
| 2016/0026997 | A1* | 1/2016 | Tsui | G06Q 20/3278 705/44 |
| 2016/0027010 | A1* | 1/2016 | Babatz | G07F 7/088 705/73 |
| 2016/0080364 | A1* | 3/2016 | Karimzadeh | G06F 21/606 726/6 |
| 2016/0112381 | A1* | 4/2016 | Bhattacharyya | H04L 63/0428 713/171 |
| 2016/0132877 | A1* | 5/2016 | Carrott | G06Q 20/3829 705/71 |
| 2016/0174069 | A1* | 6/2016 | Bruner | H04L 63/065 455/411 |
| 2016/0219039 | A1* | 7/2016 | Houthooft | H04L 63/0815 |
| 2016/0239835 | A1* | 8/2016 | Marsyla | G06Q 20/3829 |
| 2016/0241543 | A1* | 8/2016 | Jung | H04L 63/083 |
| 2016/0294783 | A1* | 10/2016 | Piqueras Jover | H04W 12/04 |
| 2016/0295404 | A1* | 10/2016 | Gouget | H04L 63/0876 |
| 2016/0300224 | A1* | 10/2016 | Liu | G06K 19/06112 |
| 2016/0307190 | A1* | 10/2016 | Zarakas | G06Q 20/321 |
| 2016/0321660 | A1* | 11/2016 | Liu | G06Q 20/384 |
| 2016/0330616 | A1* | 11/2016 | Koriyama | H04W 12/033 |
| 2017/0076277 | A1* | 3/2017 | Zhou | G06Q 20/3274 |
| 2017/0084116 | A1* | 3/2017 | Anderson | G07F 17/3225 |
| 2017/0109738 | A1* | 4/2017 | Brown | G06Q 20/325 |
| 2017/0124554 | A1* | 5/2017 | Sloan | H04L 63/0492 |
| 2017/0223532 | A1* | 8/2017 | Chen | H04L 63/107 |
| 2017/0230345 | A1* | 8/2017 | Piqueras Jover | H04L 63/0428 |
| 2017/0289185 | A1* | 10/2017 | Mandyam | H04L 63/12 |
| 2017/0310479 | A1* | 10/2017 | Sato | H04L 9/0822 |
| 2018/0063874 | A1* | 3/2018 | Wu | H04N 7/188 |
| 2018/0096340 | A1* | 4/2018 | Omojola | H04L 9/50 |
| 2018/0108008 | A1* | 4/2018 | Chumbley | G06Q 20/36 |
| 2018/0114226 | A1* | 4/2018 | Desai | G06Q 20/40145 |
| 2018/0121891 | A1* | 5/2018 | Hosny | G06Q 20/027 |
| 2018/0121895 | A1* | 5/2018 | Mohrlock | G06Q 20/10 |
| 2018/0124596 | A1* | 5/2018 | Iannace | H04W 24/08 |
| 2018/0174149 | A1* | 6/2018 | Goldschmidt | G07F 7/1008 |
| 2018/0183608 | A1* | 6/2018 | Koyun | H04L 63/062 |
| 2018/0270340 | A1* | 9/2018 | Ahmad | H04M 1/72412 |
| 2018/0300730 | A1* | 10/2018 | Telford-Reed | G06F 21/32 |
| 2019/0236599 | A1* | 8/2019 | Jeong | G06Q 20/34 |
| 2019/0379667 | A1* | 12/2019 | Touboul | H04L 63/20 |
| 2020/0058023 | A1* | 2/2020 | Travizano | H04L 9/3239 |
| 2020/0058068 | A1* | 2/2020 | Gandhi | G06Q 40/02 |
| 2020/0104830 | A1* | 4/2020 | Hart | G06K 19/0723 |
| 2020/0169550 | A1* | 5/2020 | Xie | H04L 63/0853 |
| 2020/0294106 | A1* | 9/2020 | Seshan | G06N 20/00 |
| 2020/0349573 | A1* | 11/2020 | Dong | G06N 5/022 |
| 2021/0012339 | A1* | 1/2021 | Rafferty | G06Q 20/3223 |
| 2021/0012401 | A1* | 1/2021 | Osborn | G06Q 20/3278 |
| 2021/0073809 | A1* | 3/2021 | Liu | G06K 19/06112 |
| 2021/0201296 | A1* | 7/2021 | Rule | G06F 21/34 |
| 2021/0279717 | A1* | 9/2021 | Gupta | G06Q 20/352 |
| 2021/0326818 | A1* | 10/2021 | Hogg | G06Q 20/085 |
| 2021/0344660 | A1* | 11/2021 | Benkreira | G06Q 40/02 |

FOREIGN PATENT DOCUMENTS

| CN | 02930435 | 2/2013 |
| CN | 03067335 | 4/2013 |
| CN | 04038924 | 9/2014 |
| WO | 2006014043 | 2/2006 |

OTHER PUBLICATIONS

Gupta et al (A New Framework for Credit Card Transactions involving Mutual Authentication between Cardholder and Merchant) (Year: 2011).*

Matanovic et al (Enforcing access restrictions on terminal maintenance tasks using smart cards ) (Year: 2009).

Chinese Office Action for Application No. 2014100060835 dated Jan. 29, 2016, and an English concise explanation of relevance thereof.

International Preliminary Report for Application No. PCT/CN2015/070230 dated Jul. 12, 2016.

International Search Report for Application No. PCT/CN2015/070230 dated Apr. 9, 2015.

* cited by examiner

Provide updated card-specific data to the smart card, wherein the updated card-specific data is encrypted with the stored encryption key corresponding to the respective user account ⊢ 826

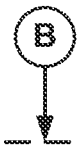

In accordance with unsuccessful completion of at least one of the first and the second verification processes: ⊢ 828

Locking-out the respective user account from performing subsequent transactions; and Sending a notification to an electronic device linked to the respective user account indicating failure of the at least one of the first verification process and the second verification process

FIG. 8D

METHOD, SERVER, AND STORAGE MEDIUM FOR VERIFYING TRANSACTIONS USING A SMART CARD

CROSS-REFERENCE TO RELATED APPLICATIONS

This application is a continuation of U.S. application Ser. No. 15/177,413 filed on Jun. 9, 2016, which is a continuation of International Application No. PCT/CN2015/070230, filed on Jan. 6, 2015, which claims the benefit and priority of Chinese Application No. 201410006083.5, filed on Jan. 7, 2014. The entire disclosures of each of the above applications are incorporated herein by reference.

FIELD

The present disclosure relates to Internet communications and to a method, server and storage medium for verifying a transaction using a smart card.

BACKGROUND

This section provides background information related to the present disclosure which is not necessarily prior art.

With the rapid development of mobile Internet technologies, mobile terminals have become increasingly more useful. For example, as with most mobile terminals, a mobile terminal may include a function for resource processing. A user may process user resource information (e.g., account balance or payment account information) of two users by using the function of resource processing of the mobile terminal.

The two users include a first user and a second user, and a process in which the mobile terminal processes user resource information of the first user and user resource information of the second user is as follows. The first user turns on a first mobile phone and opens an application associated with the resource processing function (e.g., an online payment function), and the application then generates a two-dimensional code and displays the two-dimensional code on the first mobile phone, where the two-dimensional code includes an openID. A second terminal associated with a merchant scans the two-dimensional code, acquires the openID from the two-dimensional code, and sends the openID and amount transfer information to a server, where the amount transfer information includes user identifier information corresponding to the merchant and a resource amount. The server acquires user identifier information corresponding to the first user according to the openID, acquires user resource information of the first user according to the user identifier information, acquires the user resource information of the second user according to the user identifier information corresponding to the second user, subtracts the resource amount from a first amount included in the user resource information of the first user, and adds the resource amount to a second amount included in the user resource information of the second user. As such, processing of the user resource information of the first user and the user resource information of the second user is performed to complete a transaction.

SUMMARY

This section provides a general summary of the disclosure, and is not a comprehensive disclosure of its full scope or all of its features.

In various embodiments, a method of verifying a transaction using a smart card includes receiving a transaction request from a first terminal to perform a transaction with a user of the smart card, where the transaction request includes card identification information and encrypted card data extracted by the first terminal from the smart card, and transaction information and determining a respective user account linked to the card identification information; performing a first verification process to authenticate the smart card, including: verifying that the smart card possesses a correct decryption key corresponding to the card identification information; performing a second verification process to authenticate the smart card, including: verifying that the encrypted card data extracted from the smart card encodes stored card data corresponding to the respective user account linked to the card identification information, and, in accordance with successful completion of the first and the second verification processes, processing the transaction in accordance with the transaction information.

In various embodiments, a server includes one or more processors and memory storing one or more programs for execution by the one or more processors, the one or more programs include instructions for performing the operations of any of the methods described herein. In various embodiments, a non-transitory computer readable storage medium storing one or more programs, the one or more programs comprising instructions, which, when executed by a server with one or more processors, cause the server to perform operations of any of the methods described herein.

Further areas of applicability will become apparent from the description provided herein. The description and various examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The aforementioned features and benefits of the disclosed technology as well as additional features and benefits thereof will be more clearly understood hereinafter as a result of a detailed description of various embodiments when taken in conjunction with the drawings.

To describe the embodiments of the present disclosed technology or in the prior art more clearly, the following briefly introduces the accompanying drawings necessary for describing the embodiments or the prior art. The accompanying drawings in the following description show various embodiments of the present disclosed technology, and persons of ordinary skill in the art may still derive other drawings from these accompanying drawings without creative efforts.

FIGS. 8A-8D illustrate a flowchart diagram of a method of verifying a transaction using a smart card in accordance with various embodiments;

Corresponding reference numerals indicate corresponding parts throughout the several views of the drawings.

DETAILED DESCRIPTION

Example embodiments will now be described more fully with reference to the accompanying drawings.

At least the following challenges exist in the prior art. It takes a significant amount of time to start the application and generate the two-dimensional code, leading to a long lapse of time which may be tens of seconds or longer between when the first user turns on the first mobile phone to the scanning of the displayed two-dimensional code by the merchant. Therefore, the prior art is unsuitable in terms of processing efficiency. The techniques described in the present disclosure provides a streamlined transaction process using inexpensive, simple, and lightweight information carriers having some limited information processing capabilities, such as an information carrier in the form of a smart card or label, such that secure and convenient payment transactions can be accomplished without requiring cumbersome code scanning through using a mobile phone camera. The technique described herein can also be implemented using more sophisticated devices, such as a smart watch or other smart accessories worn by users.

Reference will now be made in detail to various embodiments, examples of which are illustrated in the accompanying drawings. In the following detailed description, numerous details are set forth in order to provide a thorough understanding of the subject matter presented herein. It will be apparent to one skilled in the art that the subject matter may be practiced without these details. In other instances, well-known methods, procedures, components, and circuits have not been described in detail so as not to unnecessarily obscure aspects of the embodiments.

This disclosure describes the technical methods in the various embodiments with reference to the accompanying drawings in the embodiments of the present disclosure. The described various embodiments are merely a portion of the various embodiments of the present disclosure. All other embodiments obtained by persons of ordinary skill in the art based on the various embodiments of the present disclosure without creative efforts shall fall within the protection scope of the present disclosure.

Figure 1:
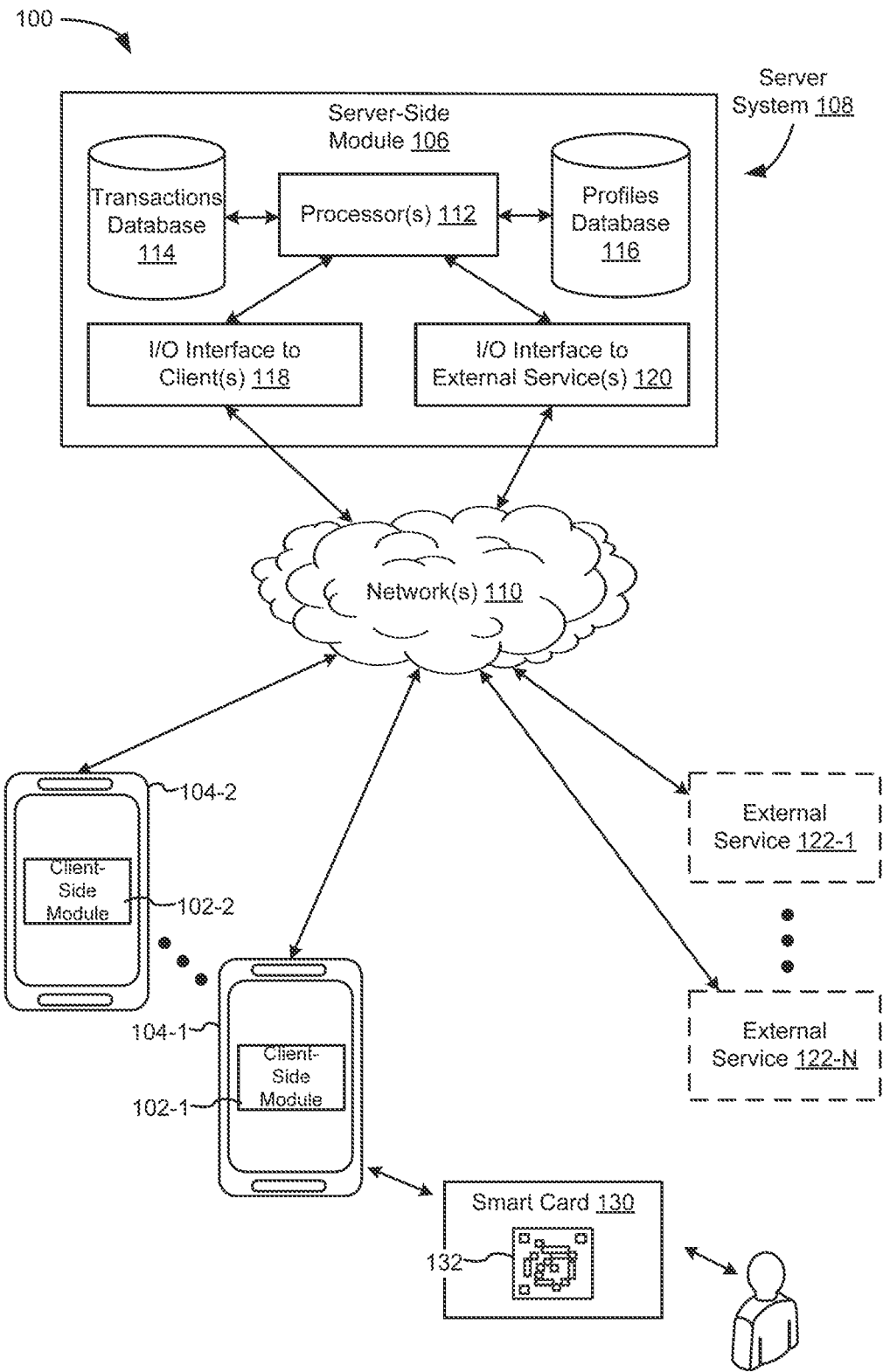
FIG. 1 is a block diagram of a server-client environment in accordance with various embodiments.

As shown in FIG. 1, data processing for a transaction processing application is implemented in a server-client environment 100 in accordance with various embodiments. In accordance with the various embodiments, server-client environment 100 includes client-side processing 102-1, 102-2 (hereinafter "client-side modules 102") executed on a client device 104-1, 104-2, and server-side processing 106 (hereinafter "server-side module 106") executed on a server system 108. Client-side module 102 communicates with server-side module 106 through one or more networks 110. Client-side module 102 provides client-side functionalities for the transaction processing application and communications with server-side module 106. Server-side module 106 provides server-side functionalities for the transaction processing application for any number of client modules 102 each residing on a respective client device 104.

In various embodiments, server-side module 106 includes one or more processors 112, transactions database 114, profiles database 116, an I/O interface to one or more clients 118, and an I/O interface to one or more external services 120. I/O interface to one or more clients 118 facilitates the client-facing input and output processing for server-side module 106. In various embodiments, processor(s) 112 performs at least a first and second verification processes to authenticate a smart card 130 and process a transaction between a user of smart card 130 and a first terminal in accordance with a determination that the first and second authentication processes are successful. Transactions database 114 stores transaction information for processed and failed transactions, and profiles database 116 stores a plurality of user profiles for user accounts registered in the transaction processing application, where a respective user profile includes one or more of account credentials for a respective user account, payment information for the respective user account, and card information for a smart card linked to the respective user account (e.g., card identification information, a respective encryption key, a respective decryption key, and card data (in encrypted to decrypted form)). I/O interface to one or more external services 120 facilitates communications with one or more external services 122 (e.g., banking services, online shopping services, account settlement services, application hosting, web hosting, or cloud-based services such as video and/or image hosting and storage websites).

Examples of client device 104 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, vehicle-mounted computer, an ebook reader, or a combination of any two or more of these data processing devices or other data processing devices.

Examples of one or more networks 110 include local area networks (LAN) and wide area networks (WAN) such as the Internet. One or more networks 110 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more stand-alone data processing apparatuses or a distributed network of computers. In various embodiments, server system 108 also employs various virtual devices and/or services of third party service providers (e.g., third-party cloud service providers) to provide the underlying computing resources and/or infrastructure resources of server system 108. In various embodiments, server system 108 includes, but is not limited to, a handheld computer, a tablet computer, a laptop computer, a desktop computer, or a combination of any two or more of these data processing devices or other data processing devices.

Server-client environment 100 shown in FIG. 1 includes both a client-side portion (e.g., client-side module 102) and a server-side portion (e.g., server-side module 106). In various embodiments, data processing is implemented as a standalone application installed on client device 104. In addition, the division of functionalities between the client and server portions of client-server environment 100 can vary in different embodiments. For example, in various embodiments, client-side module 102 is a thin-client that provides user-facing input and output processing functions, and delegates all other data processing functionalities to a backend server (e.g., server system 108). Although many aspects of the present technology are described from the perspective of server system 108, the corresponding actions performed by client device 104 would be apparent to one skilled in the art without any creative efforts. Further, some aspects of the present technology may be performed by server system 108, client device 104, or server system 108 and client device 104, cooperatively.

Figure 2:
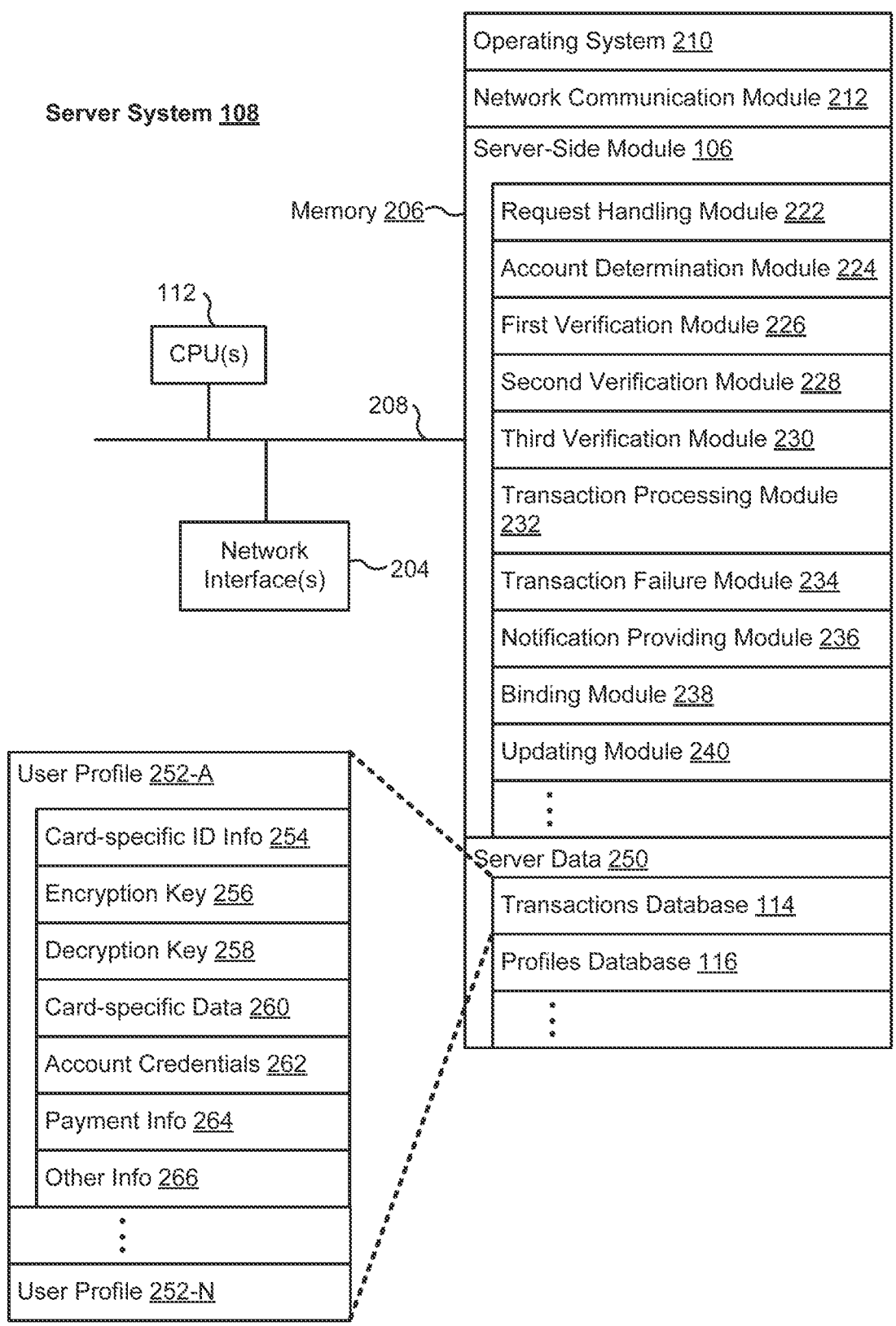
FIG. 2 is a block diagram of a server system in accordance with various embodiments.

FIG. 2 is a block diagram illustrating server system 108 in accordance with various embodiments. Server system 108, typically, includes one or more processing units (CPUs) 112, one or more network interfaces 204 (e.g., including I/O interface to one or more clients 118 and I/O interface to one or more external services 120), memory 206, and one or more communication buses 208 for interconnecting these components (sometimes called a chipset). Memory 206 includes high-speed random access memory, such as DRAM, SRAM, DDR RAM, or other random access solid state memory devices. Memory 206 optionally, includes non-volatile memory, such as one or more magnetic disk storage devices, one or more optical disk storage devices, one or more flash memory devices, or one or more other non-volatile solid state storage devices. Memory 206 includes one or more storage devices remotely located from one or more processing units 112. Memory 206, or alternatively the non-volatile memory within memory 206, includes a non-transitory computer readable storage medium. In some implementations, memory 206, or the non-transitory computer readable storage medium of memory 206, stores the following programs, modules, and data structures, or a subset or superset thereof:

operating system 210 including procedures for handling various basic system services and for performing hardware dependent tasks;

network communication module 212 for connecting server system 108 to other computing devices (e.g., client devices 104 and external service(s) 122) connected to one or more networks 110 via one or more network interfaces 204 (wired or wireless);

server-side module 106, which provides server-side data processing and functionalities for the transaction processing application, including but not limited to:

request handling module 222 for receiving a transaction request from a client device 104 (e.g., a point-of-sale (POS) terminal) to perform a transaction with a user of the smart card, where the transaction request includes card identification information and encrypted card data extracted from the smart card, and transaction information;

account determination module 224 for identifying a user account registered with the transaction processing application that is bound to the card identification information of the smart card;

first verification module 226 for performing a first verification process to authenticate the smart card by verifying that the smart card possesses a correct decryption key corresponding to the card identification information;

second verification module 228 for performing a second verification process to authenticate the smart card by verifying that the encrypted card data extracted from the smart card encodes stored card data corresponding to the respective user account linked to the card identification information;

third verification module 230 for performing a third verification process in accordance with a determination that the transaction information is associated with a security risk;

transaction processing module 232 for processing the transaction corresponding to the transaction request in accordance with a determination that the first verification process performed by first verification module 226 and the second verification process performed by second verification module 228 are successful;

transaction failure module 234 for locking-out the user account corresponding to the card identification information from performing subsequent transactions and sending a notification to an electronic device linked to the user account indicating failure in accordance with a determination that either the first verification process performed by first verification module 226 or the second verification process performed by second verification module 228 are unsuccessful;

notification providing module 236 for providing a notification to the client device corresponding to the transaction request indicating successful processing of the transaction or failure of the first verification process or the second verification process;

binding module 238 for performing a registration process whereby a user account in the transaction processing application is linked to card identification information corresponding to a smart card; and updating module 240 for updating the encrypted card data stored by a smart card;

server data 250 storing data for the transaction processing application, including but not limited to:

transactions database 114 storing transaction information for processed and failed transactions; and profiles database 116 storing a plurality of user profiles 252 for user accounts registered in the transaction processing application, where a respective user profile 252-A includes one or more of: account credentials 262 for a respective user account, payment information 264 for the respective user account, and card information for a smart card linked to the respective user account (e.g., card identification information 254, a respective encryption key 256, a respective decryption key 258, and card data 260).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

Figure 3:
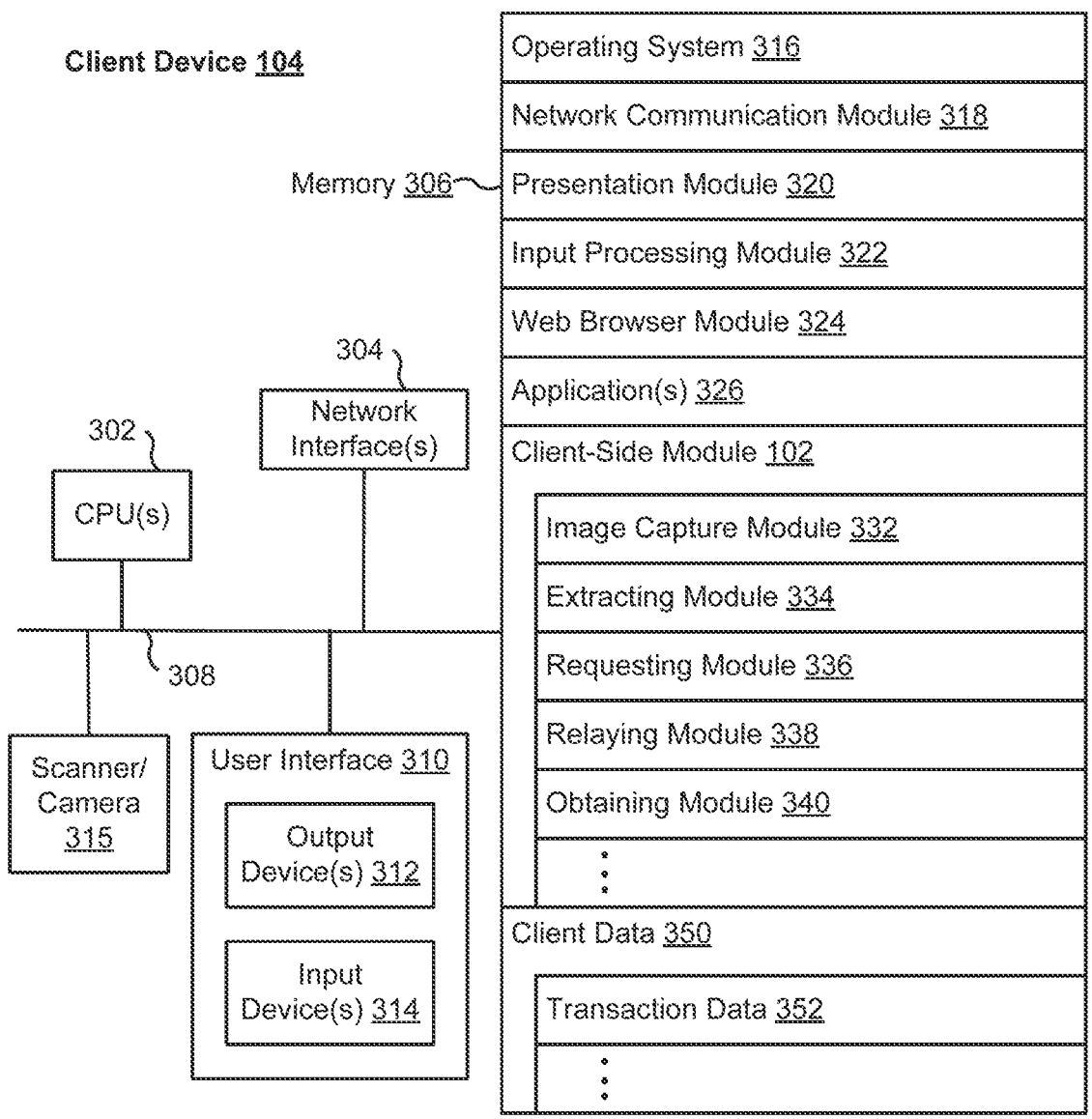
FIG. 3 is a block diagram of a client device in accordance with various embodiments.

FIG. 3 is a block diagram illustrating a representative client device 104 associated with a user (e.g., a merchant, or a user requesting payment) in accordance with various embodiments. Client device 104 typically includes one or more processing units (CPUs) 302, one or more network interfaces 304, memory 306, and one or more communication buses 308 for interconnecting these components (sometimes called a chipset). Client device 104 also includes a user interface 310. User interface 310 includes one or more output devices 312 that enable presentation of media content, including one or more speakers and/or one or more visual displays. User interface 310 also includes one or more input devices 314, including user interface components that facilitate user input such as a keyboard, a mouse, a voice-command input unit or microphone, a touch screen display, a touch-sensitive input pad, a gesture capturing camera, or other input buttons or controls. Further, some client devices 104 use a microphone and voice recognition or a camera and gesture recognition to supplement or replace the keyboard. In various embodiments, client device 104 includes one or more cameras, scanners, or photo sensor units 315 for capturing images, for example, of graphic code 132 on smart card 130. Memory 306 includes high-speed random access memory, such as DRAM, SRAM, DDR RAM, or other random access solid state memory devices, and, optionally, includes non-volatile memory, such as one or more magnetic disk storage devices, one or more optical disk storage devices, one or more flash memory devices, or one or more other non-volatile solid state storage devices. In various embodiments, memory 306 includes one or more storage devices remotely located from one or more processing units 302. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:

operating system 316 including procedures for handling various basic system services and for performing hardware dependent tasks;

network communication module 318 for connecting client device 104 to other computing devices (e.g., server system 108 and external service(s) 122) connected to one or more networks 110 via one or more network interfaces 304 (wired or wireless); presentation module 320 for enabling presentation of information (e.g., a user interface for application(s) 326 or the transaction processing application, widgets, websites and web pages thereof, and/or games, audio and/or video content, text, etc.) at client device 104 via one or more output devices 312 (e.g., displays, speakers, etc.) associated with user interface 310;

input processing module 322 for detecting one or more user inputs or interactions from one of the one or more input devices 314 and interpreting the detected input or interaction;

web browser module 324 for navigating, requesting (e.g., via HTTP), and displaying websites and web pages thereof;

one or more applications 326 for execution by client device 104 (e.g., games, application marketplaces, payment platforms, and/or other web or non-web based applications);

client-side module 102, which provides client-side data processing and functionalities for the transaction processing application, including but not limited to:

image capture module 332 for capturing images with one or more cameras, scanners, or photo sensor units 315, for example, an image of a graphic code 132 (e.g., a QR code) on a smart card 130 (as shown in FIG. 1);

extracting module 334 for extracting card identification information and card data encoded in graphic code 132 of smart card 130 (as shown in FIG. 1);

requesting module 336 for sending a transaction request to server system 108 including card identification information and encrypted card data extracted from smart card 130 (as shown in FIG. 1), and transaction information;

relaying module 338 for relaying information from server system 108 to smart card 130 (as shown in FIG. 1) and vice versa for the first authentication process and the second authentication process; and obtaining module 340 for obtaining a notification from server system 108 indicating successful processing of the transaction or failure of the first verification process or the second verification process;

verification module (optional) for performing at least the first verification process on behalf of the user to determine whether the smart card possesses a correct decryption key, including, for example, receiving the encryption key from the server, generating the random string, encrypting the random string, sending the smart string to the smart card, receiving decrypted string from the smart card, and verifying whether the received decrypted string matches the random string. If the smart passes the first verification process, the verification module lets the server proceed with the second verification process; and client data 350 storing data associated with the transaction processing application, including, but is not limited to transaction data 352 storing information related with successful and failed transactions such as transaction amount, transaction time, goods and/or services associated with the transaction, card identification corresponding to the smart card that initiated the transaction, and/or the like.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Further, memory 306, optionally, stores additional modules and data structures not described above.

In various embodiments, at least some of the functions of server system 108 are performed by client device 104, and the corresponding sub-modules of these functions may be located within client device 104 rather than server system 108. In various embodiments, at least some of the functions of client device 104 are performed by server system 108, and the corresponding sub-modules of these functions may be located within server system 108 rather than client device 104. Client device 104 and server system 108 shown in FIGS. 2-3, respectively, are merely illustrative, and various configurations of the modules for implementing the functions described herein are possible in various embodiments.

Figure 4:
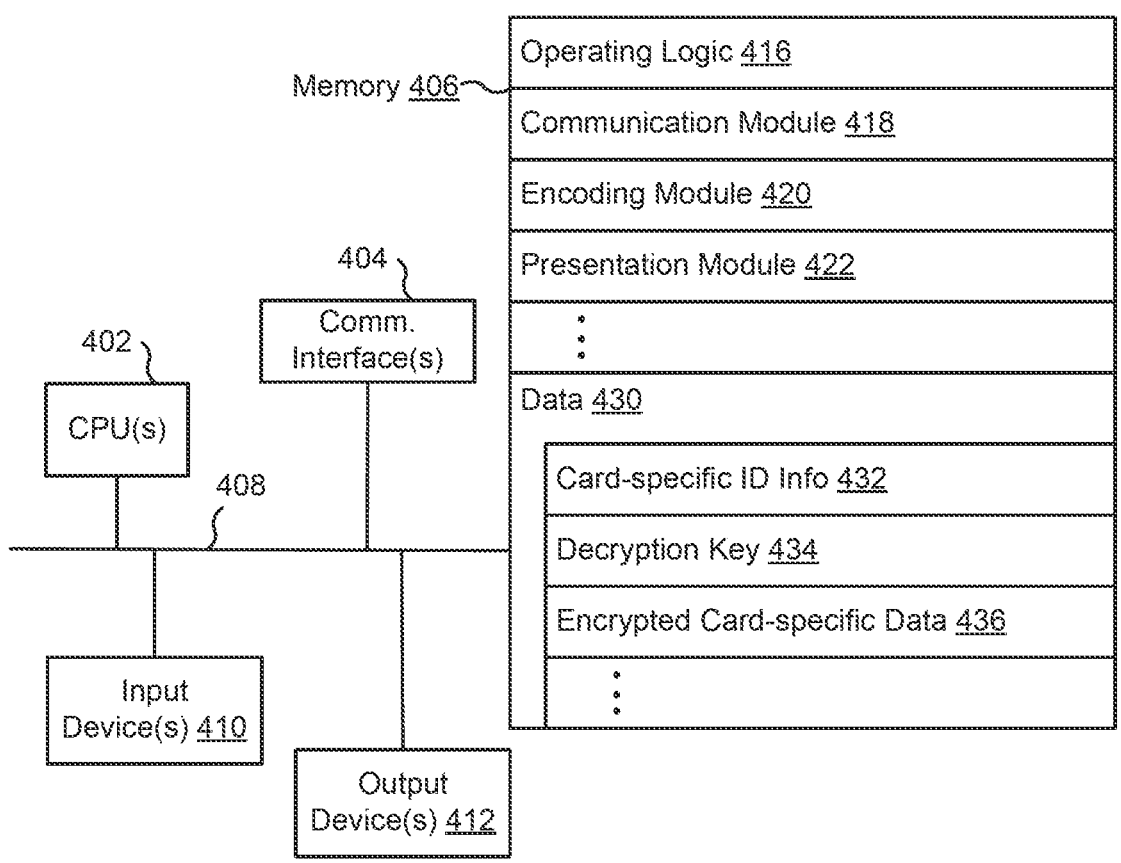
FIG. 4 is a block diagram of a smart card in accordance with various embodiments.

FIG. 4 is a block diagram illustrating smart card 130 in accordance with various embodiments. In various embodiments, smart card 130 includes one or more processing units (e.g., CPUs, ASICs, FPGAs, microprocessors, and the like) 402, one or more communication interfaces 404, memory 406, and one or more communication buses 408 for interconnecting these components (sometimes called a chipset). In various embodiments, smart card 130 includes one or more input devices 410, such as one or more buttons for receiving input. In various embodiments, smart card 130 includes one or more output devices 412, such as a display for displaying a graphic code. Memory 406 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 406, optionally, includes one or more storage devices remotely located from one or more processing units 402. Memory 406, or alternatively the non-volatile memory within memory 406, includes a non-transitory computer readable storage medium. In some implementations, memory 406, or the non-transitory computer readable storage medium of memory 406, stores the following programs, modules, and data structures, or a subset or superset thereof:

operating logic 416 including procedures for handling various basic system services and for performing hardware dependent tasks;

communication module 418 for obtaining data from or sending data to other computing devices such as client device 104;

(optionally) encoding module 420 for encoding card identification information and card data into a graphic code (e.g., a QR code such as graphic code 132 in FIG. 1) that changes overtime in accordance with a predetermined updating algorithm;

(optionally) presentation module 422 for displaying the graphic code (e.g., graphic code 132 in FIG. 1) encoded by encoding module 420 via one of one or more output devices 412 (e.g., a display); and data 430 storing data, including but not limited to:

card identification information 432 corresponding to a serial number for smart card 130;

decryption key 434 for responding to authentication challenges; and encrypted card data 436 for verifying the authenticity of smart card 130.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 406, optionally, stores a subset of the modules and data structures identified above. Further, memory 406, optionally, stores additional modules and data structures not described above.

In various embodiments, the smart card 130 does not include a processor, and the processing functions may be accomplished through specially designed integrated circuits. The input and output interfaces of the smart card 130 may be designed to communicate with a card reading device (e.g., a client device 108 or a kiosk) through one or more wired and/or wireless transmission lines/ports. In various embodiments, when static graphic code are used to encode the card identification information, the graphic code may be printed on the surface of the smart card and scanned by a card reading device by a camera or barcode scanner. Other ways of implementing the various functions of the smart card are possible. Although a "smart card" is used in the present disclosure to describe the verification techniques, it would be apparent to a person skilled in the art that the "smart card" may adopt other suitable formats, shapes, and sizes, in actual use.

Figure 5:
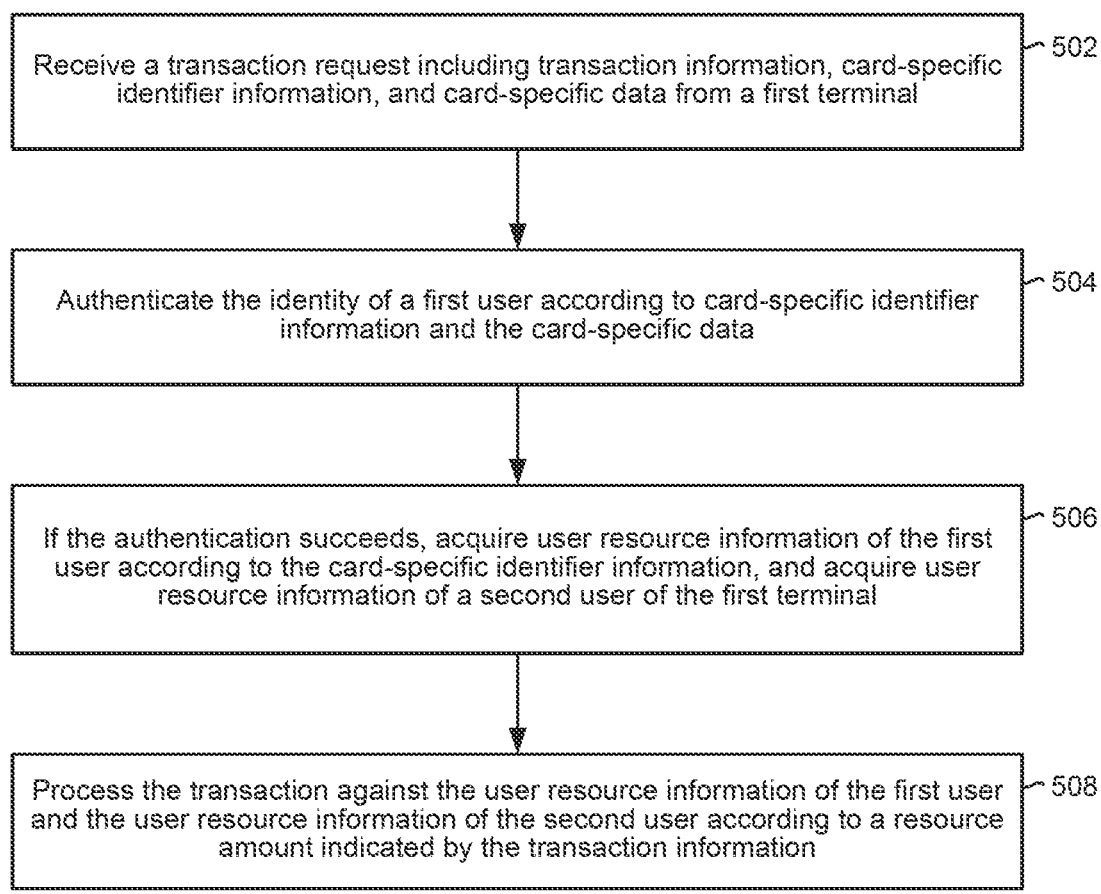
FIG. 5 illustrates a flowchart diagram of a method of processing user resource information in accordance with various embodiments.

FIG. 5 illustrates a flowchart diagram of a method 500 of processing user resource information in accordance with various embodiments. In various embodiments, method 500 is performed by a server with one or more processors and memory. For example, in various embodiments, method 500 is performed by server system 108 (FIGS. 1-2) or a component thereof (e.g., server-side module 108, FIGS. 1-2). In various embodiments, method 500 is governed by instructions that are stored in a non-transitory computer readable storage medium and the instructions are executed by one or more processors of the server.

In various embodiments, data processing for a transaction processing application is implemented in client-server environment 100 (FIG. 1) with a server system 108 and client-side module 102 executed on one or more client devices 104. In various embodiments, server system 108 (FIGS. 1-2) manages and operates the transaction processing application. In various embodiments, a respective client-side module 102 (FIGS. 1 and 3) is associated with a user account in the transaction processing application that corresponds to a user of client device 104 (FIGS. 1 and 3). For example, client device 104 corresponds to a point-of-sale (POS) terminal of a merchant that captures a graphic code 132 on a smart card 130 so as to charge a payment account associated with the user of smart card 130 for goods and/or services provided by the merchant.

The server receives (502) a transaction request including transaction information, card identifier information, and card data from a first terminal. For example, the transaction information includes a resource amount for the transaction, goods and/or services associated with the transaction, time/date and location of the transaction, and identifier information associated with the first terminal (e.g., a merchant's point-of-sale (POS) terminal).

The server authenticates (504) the identity of a first user according to the card identifier information and the card data.

If the authentication succeeds, the server acquires (506) user resource information of the first user according to the card identifier information, and acquires user resource information of a second user of the first terminal.

The server processes (508) the transaction against the user resource information of the first user and the user resource information of the second user according to a resource amount indicated by the transaction information. For example, a first payment account corresponding to the user resource information of the first user is debited according to the resource amount, and a second payment corresponding to the user resource information of the second user is credited according to the resource amount.

In method 500, the first terminal directly acquires card identifier information and card data from a smart card, and the server processes user resource information of a first user associated with the smart card and user resource information of a second user associated with the first terminal. It takes a short time for the first terminal to acquire the card identifier information and card data from the smart card, thereby improving efficiency of processing user resource information.

It should be understood that the particular order in which the operations in FIG. 5 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein (e.g., methods 700 and 800, and process 600) are also applicable in an analogous manner to method 500 described above with respect to FIG. 5.

Figure 6:
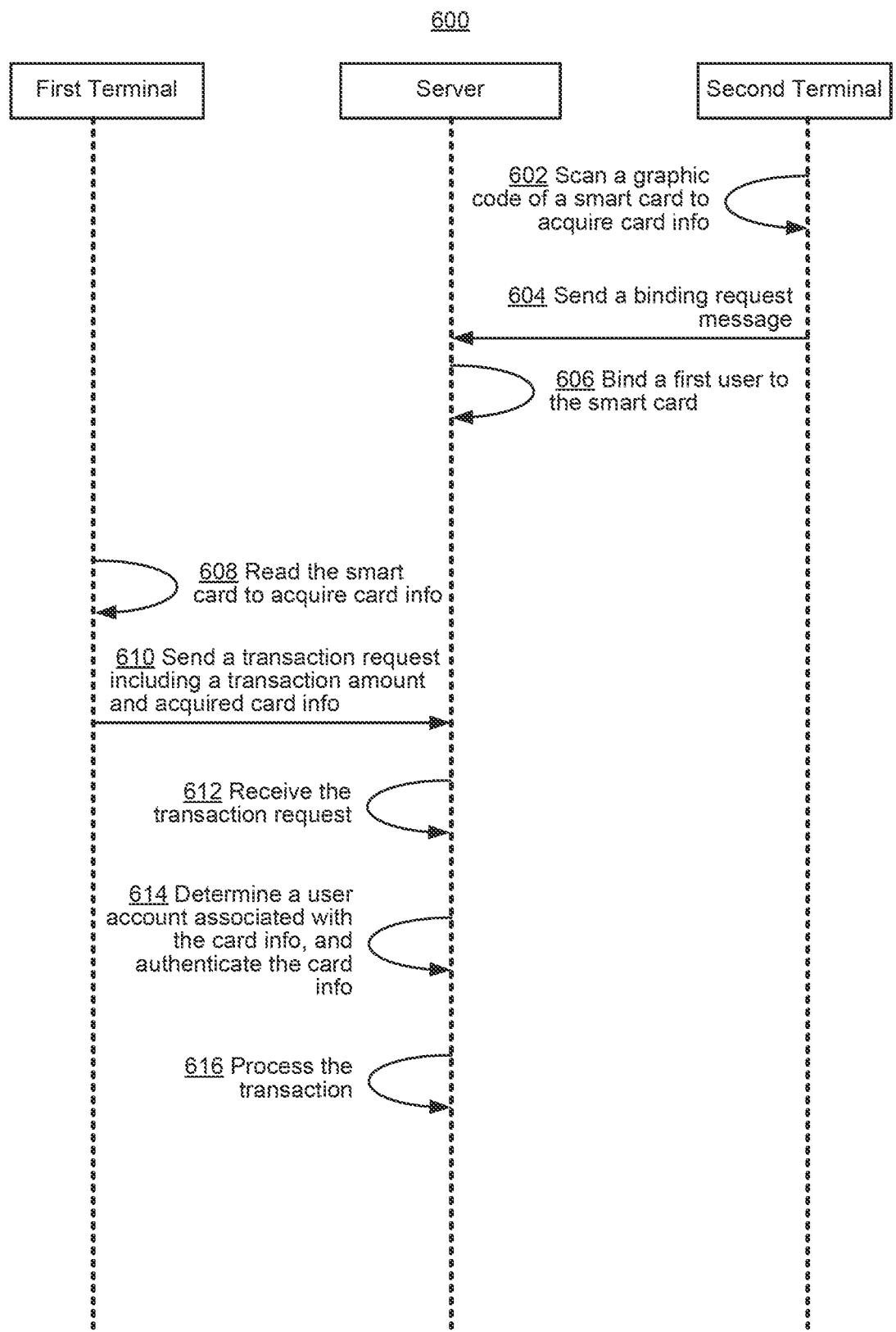
FIG. 6 illustrates a flow diagram of a process for processing user resource information in accordance with various embodiments.

FIG. 6 illustrates a flow diagram of a process 600 for processing user resource information in accordance with various embodiments. In various embodiments, process 600 is performed by a first terminal with one or more processors and memory, a second terminal with one or more processors and memory, and a server with one or more processors and memory. For example, in various embodiments, the first terminal is a first client device 104-1 (FIGS. 1 and 3) or a component thereof (e.g., client-side module 102-1, FIGS. 1 and 3) associated with a point-of-sale (POS) terminal of a merchant. For example, in various embodiments, the second terminal is a second client device 104-2 (FIGS. 1 and 3) or a component thereof (e.g., client-side module 102-2, FIGS. 1 and 3) associated with a mobile device of a user in possession of smart card 130. For example, in various embodiments, the server is server system 108 (FIGS. 1-2) or a component thereof (e.g., server-side module 106, FIGS. 1-2) that provides and manages the transaction processing application.

In various embodiments, data processing for a transaction processing application is implemented in client-server environment 100 (FIG. 1) with a server system 108 and client-side module 102 executed on one or more client devices 104. In various embodiments, server system 108 (FIGS. 1-2) manages and operates the transaction processing application. In various embodiments, a respective client-side module 102 (FIGS. 1 and 3) is associated with a user account in the transaction processing application that corresponds to a user of client device 104 (FIGS. 1 and 3). For example, client device 104 corresponds to a point-of-sale (POS) terminal of a merchant that captures a graphic code 132 on a smart card 130 so as to charge a payment account associated with the user of smart card 130 for goods and/or services provided by the merchant.

A second terminal scans (602) a graphic code of a smart card to acquire information from the graphic code. In various embodiments, a smart card includes a graphic code (e.g., a barcode, a two-dimensional QR code, or the like). In various embodiments, the graphic code is set by the manufacturer and is a unique graphic code. For example, a first user purchases the smart card and scans the graphic code on the smart card using a second terminal (e.g., the first user's mobile device) by capturing an image of the graphic code. In various embodiments, the smart card includes smart card includes card identifier information, card data, and a decryption key. In various embodiments, the card data is encrypted data and may be any data (e.g., unique data). In various embodiments, each smart card corresponds to a unique set of keys: an encryption key and a decryption key. In various embodiments, the card data is encrypted by using the encryption key corresponding to the smart card. In various embodiments, the graphic code is encoded with the card identifier information and the card data. In various embodiments, the server associates the card identifier information with a stored un-encrypted card data, the encryption key, and the decryption key.

The second terminal sends (604) a binding request message to the server. In various embodiments, the binding request message includes the card identifier information from the smart card and an indication of a user account for the first user of the second terminal.

The server receives (606) the binding request message and binds the user account corresponding to the first user of the second terminal to the card identifier information according to the binding request message. As such, the smart card is bound to the user account corresponding to the first user of the second terminal.

The first terminal reads (608) the smart card, and acquires card identifier information and card data from the smart card. For example, if the first user intends to perform a transaction with a merchant associated with the first terminal (e.g., a POS terminal), the first user provides the smart card to the first terminal for image capture of the graphic code. The first terminal reads the smart card, and extracts the card identifier information and card data from the smart card.

In various embodiments, the smart card is verified by sending a key acquisition request message to the server, where the key acquisition request message includes the card identifier information for the smart card. Thereafter, the server identifies a user account bound to the card identifier information and acquires an encryption key corresponding to the user account. The server sends the acquired encryption key to the first terminal. The first terminal verifies the smart card according to the encryption key, and if the verification succeeds, proceeds with the transaction. In various embodiments, the first terminal verifies the smart card in the following manner: The first terminal generates a random number, uses the encryption key to encrypt the random number to obtain an encrypted ciphertext, and sends the encrypted ciphertext to the smart card. The smart card decrypts the encrypted ciphertext by using a decryption key stored in the smart card to obtain decrypted data, and sends the decrypted data to the first terminal. The first terminal compares the decrypted data and the random number; if the two are the same, the verification of the smart card by the first terminal succeeds; if the two are different, the verification of the smart card by the first terminal fails. If the verification of the smart card by the first terminal fails, the first user and the second user are notified of the failure. The verification of the smart card by the first terminal can prevent loss to a user caused by a lawbreaker counterfeiting a smart card, thereby improving security. In various embodiments, the server may verify the smart card in the above manner using the first terminal to relay the ciphertext and decrypted data.

The first terminal sends (610) a transaction request to the server, and the transaction request includes a transaction amount and the acquired card information (i.e., the card identifier information and card data). In various embodiments, the first terminal packs transaction amount and the acquired card information into a data packet, and sends the data packet to an intermediate server corresponding to the second user (e.g., an inventory and transaction control server). In various embodiments, the intermediate server adds information, such as transaction description information and a processing time of the transaction, to the data packet, and then sends the data packet to the server.

The server receives (612) the transaction request with the transaction amount and the acquired card information (i.e., the card identifier information and card data). In various embodiments, the card data extracted by the first terminal from the graphic code of the smart card is encrypted.

The server determines (614) a user account associated with the card identifier information, and authenticates the identity of the first user according to the card identifier information and card data. If the authentication succeeds, the server performs operation 616. The server acquires stored un-encrypted card data and a decryption key corresponding to the determined user account. The server decrypts the card data included in the transaction request with the decryption key and compares the decrypted card data to the stored un-encrypted card data. If the two are the same, the authentication of the identity of the first user is successful, and if the two are different, the authentication of the identity of the first user fails. If the authentication fails, the server sends a notification message to the first terminal, and the first terminal receives the notification message and reminds the first user and the second user.

The server processes (616) the transaction according to the transaction request. In various embodiments, the server identifies first user resource information (e.g., a payment account or other payment information) of the first user based on the user account bound to the card identifier information. In various embodiments, the server identifies second user resource information (e.g., a payment account or other payment information) of the second user. Thereafter, the transaction amount indicated by the transaction request is debited from the first user resource information and credited to the second user resource information.

In various embodiments, after completing the execution of operation (616), the server sends a processing success message to the first terminal; and the first terminal receives the processing success message and reminds the first user and the second user.

In process 600, the first terminal directly acquires card identifier information and card data from a smart card, and the server processes user resource information of a first user associated with the smart card and user resource information of a second user associated with the first terminal. It takes a short time for the first terminal to acquire the card identifier information and card data from the smart card, thereby improving efficiency of processing user resource information. Moreover, the first terminal further authenticates the smart card, which may prevent a user from using a counterfeit smart card to process user resource information of the first user.

It should be understood that the particular order in which the operations in FIG. 6 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein (e.g., methods 500, 700, and 800) are also applicable in an analogous manner to method 600 described above with respect to FIG. 6.

Figure 7:
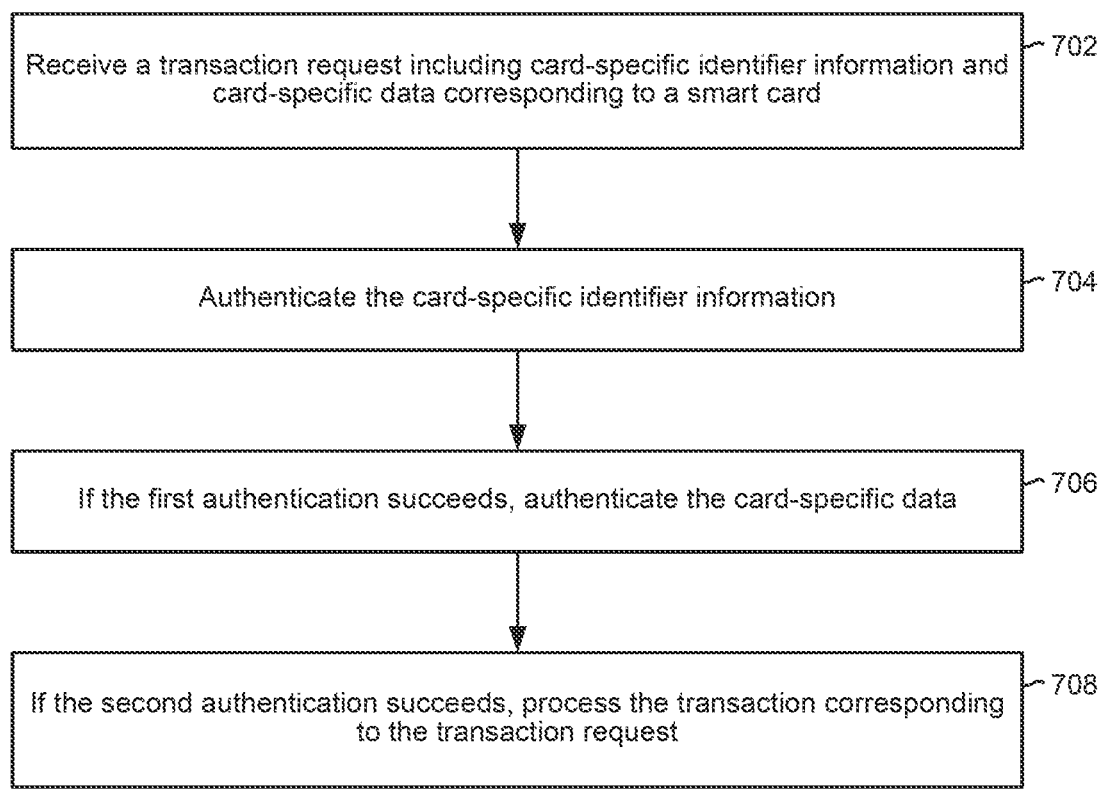
FIG. 7 illustrates a flowchart diagram of a method of processing user resource information in accordance with various embodiments.
Figure 8A:
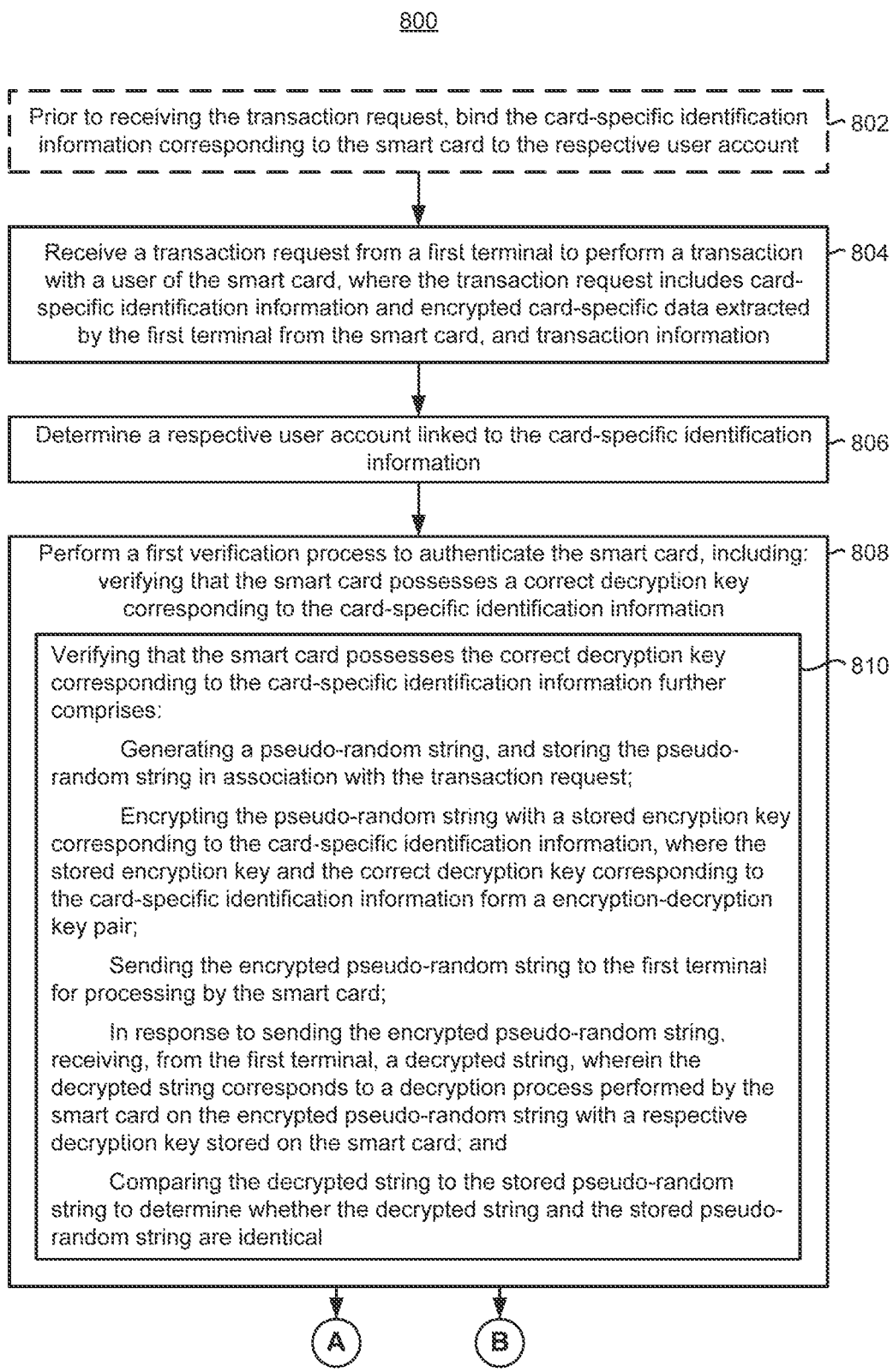
Figure 8B:
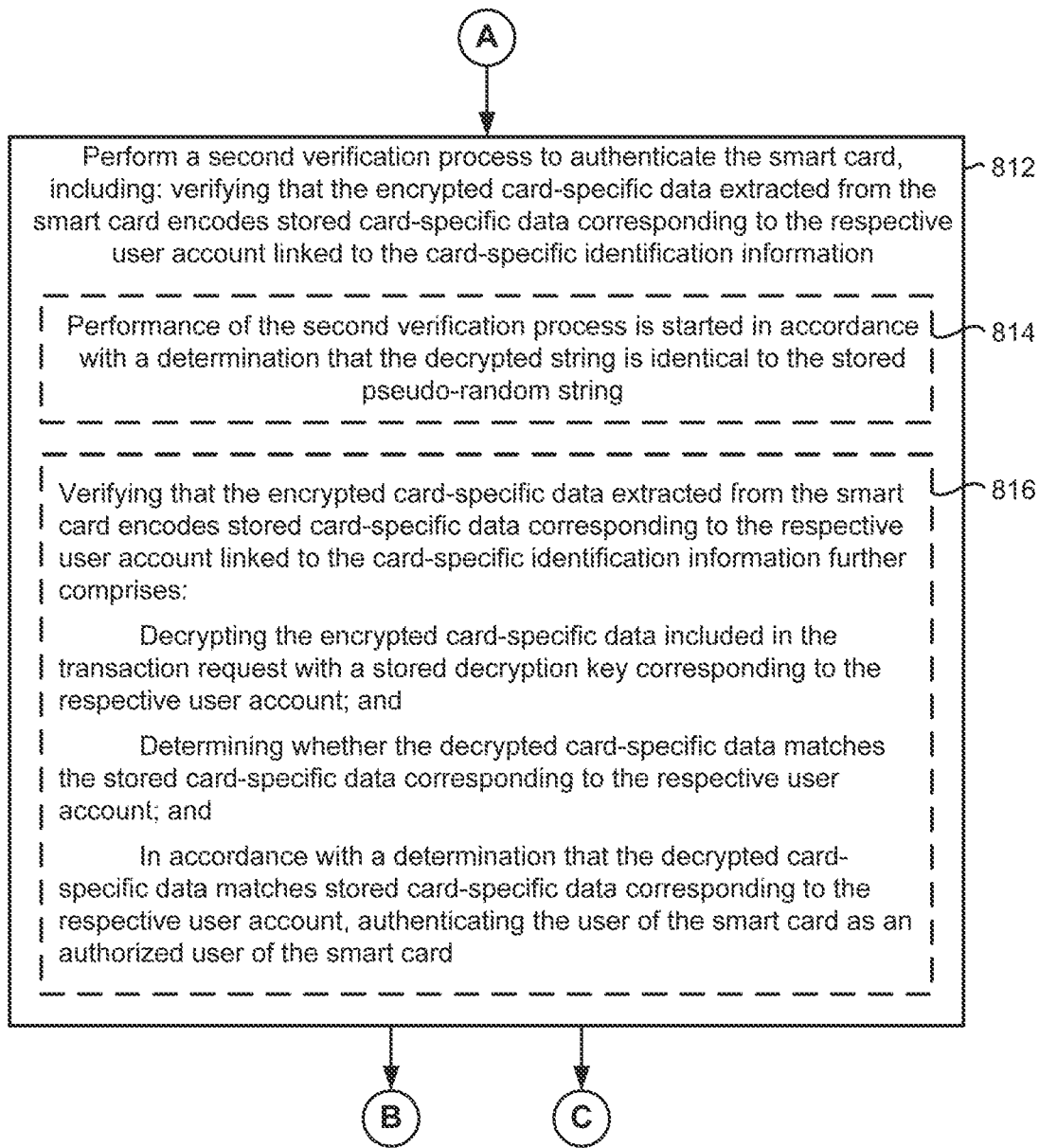
Figure 8C:
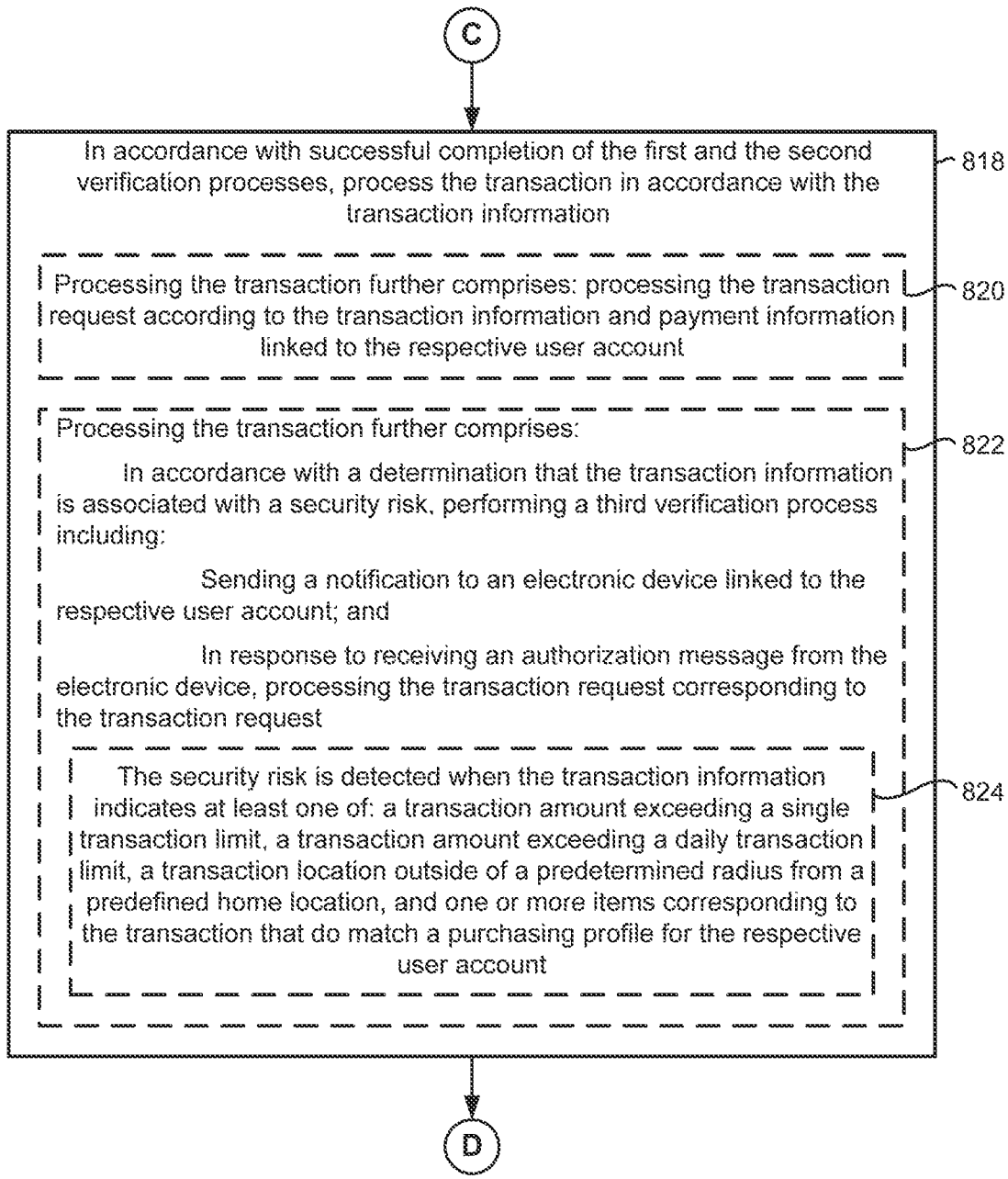

FIG. 7 illustrates a flowchart diagram of a method 700 of processing user resource information in accordance with various embodiments. In various embodiments, method 700 is performed by a server with one or more processors and memory. For example, in various embodiments, method 700 is performed by server system 108 (FIGS. 1-2) or a component thereof (e.g., server-side module 108, FIGS. 1-2). In various embodiments, method 700 is governed by instructions that are stored in a non-transitory computer readable storage medium and the instructions are executed by one or more processors of the server.

In various embodiments, data processing for a transaction processing application is implemented in client-server environment 100 (FIG. 1) with a server system 108 and client-side module 102 executed on one or more client devices 104. In various embodiments, server system 108 (FIGS. 1-2) manages and operates the transaction processing application. In various embodiments, a respective client-side module 102 (FIGS. 1 and 3) is associated with a user account in the transaction processing application that corresponds to a user of client device 104 (FIGS. 1 and 3). For example, client device 104 corresponds to a point-of-sale (POS) terminal of a merchant that captures a graphic code 132 on a smart card 130 so as to charge a payment account associated with the user of smart card 130 for goods and/or services provided by the merchant.

The server receives (702) a transaction request including card identifier information and card data corresponding to a smart card.

The server authenticates (704) the card identifier information. For example, the server identifies a user account bound to the card identifier information and acquires an encryption key corresponding to the user account. The server generates a random number, uses the encryption key to encrypt the random number to obtain an encrypted ciphertext, and sends the encrypted ciphertext to the smart card (relayed through the first terminal). The smart card decrypts the encrypted ciphertext by using a decryption key stored in the smart card to obtain decrypted data, and sends the decrypted data to the server (relayed through the first terminal). The server compares the decrypted data and the random number; if the two are the same, the first authentication succeeds; if the two are different, the verification of the smart card by the first authentication fails.

If the first authentication succeeds, the server authenticates (706) the card data. For example, the server acquires stored un-encrypted card data and a decryption key corresponding to the determined user account. The server decrypts the card data with the decryption key and compares the decrypted card data to the stored un-encrypted card data. If the two are the same, the second authentication of is successful, and if the two are different, the second authentication fails.

If the second authentication succeeds, the server processes (708) the transaction corresponding to the transaction request. For example, the server acquires first user resource information of a first user corresponding to the smart card and second user resource information of a second user corresponding to a first terminal that sent the transaction request. Continuing with this example, the transaction request includes a transaction amount, and the server processes the transaction by debiting the first user resource information according to the transaction amount and crediting the second user resource information according to the transaction amount.

In method 700, card identifier information and card data corresponding to a smart card are acquired by the server, so that the server may thereby authenticate the card identifier information and card data, which may prevent a user from using a counterfeit smart card to process user resource information of the first user.

The particular order in which the operations in FIG. 7 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein (e.g., methods 500 and 800, and process 700) are also applicable in an analogous manner to method 700 described above with respect to FIG. 7.

FIGS. 8A-8D illustrate a flowchart diagram of a method 800 of verifying a transaction using a smart card in accordance with various embodiments. In various embodiments, method 800 is performed by a server with one or more processors and memory. For example, in various embodiments, method 800 is performed by server system 108

(FIGS. 1-2) or a component thereof (e.g., server-side module 108, FIGS. 1-2). In various embodiments, method 800 is governed by instructions that are stored in a non-transitory computer readable storage medium and the instructions are executed by one or more processors of the server. Optional operations are indicated by dashed lines (e.g., boxes with dashed-line borders).

In various embodiments, data processing for a transaction processing application is implemented in client-server environment 100 (FIG. 1) with a server system 108 and client-side module 102 executed on one or more client devices 104. In various embodiments, server system 108 (FIGS. 1-2) manages and operates the transaction processing application. In various embodiments, a respective client-side module 102 (FIGS. 1 and 3) is associated with a user account in the transaction processing application that corresponds to a user of client device 104 (FIGS. 1 and 3). For example, client device 104 corresponds to a point-of-sale (POS) terminal of a merchant that captures a graphic code 132 on a smart card 130 so as to charge a payment account associated with the user of smart card 130 for goods and/or services provided by the merchant.

In various embodiments, prior to receiving the transaction request, the server binds (802) the card identification information corresponding to the smart card to the respective user account. In various embodiments, server system 108 or a component thereof (e.g., binding module 238, FIG. 2) performs a registration process whereby a user account in the transaction processing application is linked to card identification information corresponding to a smart card. For example, the user downloads an application (e.g., the transaction processing application) associated with the smart card onto his/her electronic device. Continuing with this example, the user uses executes the application and performs a registration process so as to register a user account for the application, link payment information to the user account, and bind the smart card to the user account. The user can also log into an existing user account that has associated payment account information, and scans the graphic code of the smart card from within a client application associated with the existing user account. In various embodiments, the binding process can be performed at a kiosk provided by a seller of the smart card. The binding process links the card identification information (e.g., card number or serial number) to the user account. The card identification information is associated with a decryption key (which has a corresponding encryption key stored at the server) that is also stored in the smart card before the card is sold to the user. In various embodiments, the user establishes the card data for encryption, the card data is encrypted and stored in the smart card, the encryption key, the corresponding decryption key, and the card data are all stored in the server. The user may use a special hardware to update the secret data and hence the encrypted version of the card data on the smart card. The special hardware can be a kiosk or a gadget linked to the user's device. The card data can also be updated automatically based on an algorithm, and the server or the user can provide the seed/initial input for the algorithm.

The server receives (804) a transaction request from a first terminal to perform a transaction with a user of the smart card, where the transaction request includes card identification information and encrypted card data extracted by the first terminal from the smart card, and transaction information. In various embodiments, server system 108 or a component thereof (e.g., request handling module 222, FIG. 2) receives a transaction request from a client device 104 (e.g., a point-of-sale (POS) terminal) to perform a transaction with a user of the smart card, where the transaction request includes card identification information and encrypted card data extracted from the smart card, and transaction information. In various embodiments, the smart card includes a graphic code (e.g., a QR code, barcode, or SKU) that is encoded with the card identification information (e.g., the card number or serial number) and (optionally) the encrypted card data (e.g., security information). In various embodiments, if the encrypted card data is not encoded in the graphic code, the client device reads the encrypted card data from another communication interface (e.g., wired or wireless ports) on the smart card. In various embodiments, the smart card has an encoded image displayed on it. For example, the image is a QR code printed on the smart card or otherwise statically displayed on the smart card. In various embodiments, the image is a QR code that may be dynamically updated/re-encoded. For example, changed card data causes the displayed QR code to change. For example, the transaction information indicates the transaction amount, location, time, date, item(s) involved, and the like. For example, in FIG. 1, graphic code 132 is displayed on smart card 130.

In various embodiments, the first terminal is a merchant's POS terminal. In various embodiments, the first terminal (e.g., client device 104, FIGS. 1 and 3) is associated with a particular merchant ID registered with the server. In various embodiments, the first terminal is any mobile device and the merchant may be any user having a user account registered with the server for the transaction processing application. In various embodiments, the first terminal extracts information from the smart card by scanning the graphic code displayed on the smart card or capturing an image of the graphic code displayed on the smart card. In various embodiments, the first terminal may use other near-range information exchange technology to extract the card identification information and encrypted card data from the smart card.

The server determines (806) a respective user account linked to the card identification information. In various embodiments, server system 108 or a component thereof (e.g., account determination module 224, FIG. 2) identifies a user account registered with the transaction processing application that is bound to the card identification information of the smart card. In various embodiments, server system 108 stores a profile for each user account registered with the transaction processing application in profiles database 116 (FIGS. 1-2). In various embodiments, a user profile in profiles database corresponding to a respective user account includes (A) card identification information corresponding to a smart card previously bound to the respective user account, (B) an encryption key corresponding to the respective user account, (C) a decryption key corresponding to the respective user account, and (D) card data for the smart card previously bound to the respective user account.

The server performs (808) a first verification process to authenticate the smart card by verifying that the smart card possesses a correct decryption key corresponding to the card identification information. In various embodiments, server system 108 or a component thereof (e.g., first verification module 226, FIG. 2) performs a first verification process to authenticate the smart card by verifying that the smart card possesses a correct decryption key corresponding to the card identification information.

In various embodiments, the server verifies that the smart card possesses the correct decryption key corresponding to the card identification information by (810): generating a pseudo-random string, and storing the pseudo-random string in association with the transaction request; encrypting the pseudo-random string with a stored encryption key corresponding to the card identification information, where the stored encryption key and the correct decryption key corresponding to the card identification information form an encryption-decryption key pair; sending the encrypted pseudo-random string to the first terminal for processing by the smart card; in response to sending the encrypted pseudo-random string, receiving, from the first terminal, a decrypted string, where the decrypted string corresponds to a decryption process performed by the smart card on the encrypted pseudo-random string with a respective decryption key stored on the smart card; and comparing the decrypted string to the stored pseudo-random string to determine whether the decrypted string and the stored pseudo-random string are identical. For example, first verification module 226 generates the pseudo-random string, encrypts the pseudo-random string with the encryption key corresponding to the respective user account, and sends the encrypted string to the first terminal for relaying to the smart card. Continuing with this example, the smart card decrypts the encrypted string with its stored decryption key and sends the decrypted string to the first terminal for relaying to the server. Continuing with this example, the first verification module 226 compares the decrypted string to the generated pseudo-random string, and, if the two strings match, the first verification process is successful.

In various embodiments, the smart card stores a decryption key, and also the card identification information and encrypted card data. However, in various embodiments, the identification information and encrypted card data is encoded in the graphic code or image on the smart card. In various embodiments, a processor of the smart card generates the image based on a predefined pattern/encoding algorithm with the identification information and encrypted card data as inputs. In various embodiments, the first terminal acts as a communication bridge between the server and the smart card for the first verification process. In various embodiments, the first terminal is in communication with the server via CMDA, GSM, WiFi, or the like. In various embodiments, smart card receives the encrypted string from the first terminal by way of a series of encoded pulses, an encoded EM field, an encoded signal sent via BLE, NFC, or the like.

The server performs (812) a second verification process to authenticate the smart card by verifying that the encrypted card data extracted from the smart card encodes stored card data corresponding to the respective user account linked to the card identification information. In various embodiments, server system 108 or a component thereof (e.g., second verification module 228, FIG. 2) performs a second verification process to authenticate the smart card by verifying that the encrypted card data extracted from the smart card encodes stored card data corresponding to the respective user account linked to the card identification information.

In various embodiments, the server starts (814) performance of the second verification process in accordance with a determination that the decrypted string is identical to the stored pseudo-random string. In various embodiments, second verification module 228 performs the second verification process if the first verification process performed by first verification module 226 in operations 808-810 is successful.

In various embodiments, the server verifies that the encrypted card data extracted from the smart card encodes stored card data corresponding to the respective user account linked to the card identification information by (816), including decrypting the encrypted card data included in the transaction request with a stored decryption key corresponding to the respective user account, determining whether the decrypted card data matches the stored card data corresponding to the respective user account, and, in accordance with a determination that the decrypted card data matches stored card data corresponding to the respective user account, authenticating the user of the smart card as an authorized user of the smart card. In various embodiments, second verification module 228 decrypts the encrypted card data with the decryption key corresponding to the respective user account. If the decrypted card data matches stored card data for the respective user account, the second verification process is successful.

In accordance with successful completion of the first and the second verification processes, the server processes (818) the transaction in accordance with the transaction information. In various embodiments, server system 108 or a component thereof (e.g., transaction processing module 232, FIG. 2) processes the transaction corresponding to the transaction request in accordance with a determination that the first verification process performed by first verification module 226 in operations 808-810 and the second verification process performed by second verification module 228 in operations 812 and 816 are successful. In various embodiments, server system 108 or a component thereof (e.g., notification providing module 236, FIG. 2) provides a notification to the first terminal corresponding to the transaction request indicating successful processing of the transaction after processing the transaction. In various embodiments, notification providing module 236 also provides the notification to an electronic device linked to the respective user account. For example, the notification is an email sent to an email address linked to the respective user account, or an SMS or automated phone call sent to a phone number linked to the respective user account.

In various embodiments, the server processes (820) the transaction according to the transaction information and payment information linked to the respective user account. In various embodiments, server system 108 or a component thereof (e.g., transaction processing module 232, FIG. 2) processes the transaction by deducting a transaction amount included in the transaction request from a current balance of the respective user account or from a payment account linked to the respective user account, and crediting the transaction amount included in the transaction request to a current balance of a user account corresponding to the first terminal or from a payment account linked to the user account corresponding to the first terminal. In various embodiments, the user establishes a payment limit, and each transaction cannot exceed that payment limit, unless otherwise authorized by the user through another verification method. In various embodiments, the server does not make the actual payment until the end of the day, or end of the week to give the user chance to contest the transaction.

In various embodiments, in accordance with a determination that the transaction information is associated with a security risk, the server performs (822) a third verification process including: sending a notification to an electronic device linked to the respective user account and, in response to receiving an authorization message from the electronic device, processing the transaction request corresponding to the transaction request. In various embodiments, server system 108 or a component thereof (e.g., third verification module 230, FIG. 2) performs a third verification process prior to processing the transaction and in accordance with a determination that the transaction information is associated with a security risk. In various embodiments, the security risk triggering the third verification process may be the amount of the transaction exceeding a predetermined transaction or daily/weekly threshold, the location of the transaction outside of a home city/location, time of the transaction past a normal transaction hour, and/or the item associated with the transaction is outside of the normal purchasing habits of the user. In various embodiments, in accordance with a determination that the transaction information is associated with the security risk, server system 108 sends an email to an email address linked to the respective user account, or sends an SMS or automated phone call to a phone number linked to the respective user account.

In various embodiments, the security risk is detected when the transaction information indicates (824) at least one of: a transaction amount exceeding a single transaction limit, a transaction amount exceeding a daily transaction limit, a transaction location outside of a predetermined radius from a predefined home location, and one or more items corresponding to the transaction that do match a purchasing profile for the respective user account.

In various embodiments, the server provides (826) updated card data to the smart card, where the updated card data is encrypted with the stored encryption key corresponding to the respective user account. In various embodiments, server system 108 or a component thereof (e.g., updating module 240, FIG. 2) updates the encrypted card data stored by a smart card. For example, the user interacts with a kiosk or other computing device associated with server system 108/the transaction processing application so as to obtain updated card data that is associated with a security question/information provided by the user to the kiosk. In another example, updating module 240 periodically pushes updated card data to the smart card or pushes updated card data to the smart card according to predefined schedule. As such, malevolent merchants cannot use stored card identification information and card data to perform transaction mimicking the smart card because the card data is updated.

In various embodiments, in accordance with unsuccessful completion of at least one of the first and the second verification processes, the server (828) locks-out the respective user account from performing subsequent transactions and sends a notification to an electronic device linked to the respective user account indicating failure of the at least one of the first verification process and the second verification process. In various embodiments, server system 108 or a component thereof (e.g., transaction failure module 234, FIG. 2) locks-out the user account corresponding to the card identification information from performing subsequent transactions and sends a notification to an electronic device linked to the user account indicating failure in accordance with a determination that either the first verification process performed by first verification module 226 in operations 808-810 or the second verification process performed by second verification module 228 in operations 812 and 816 are unsuccessful. For example, the notification is an email sent to an email address linked to the respective user account, or an SMS or automated phone call sent to a phone number linked to the respective user account. As such, the true user is alerted if a thief fails an attempt to user his/her smart card, and the smart card is locked from performing further transaction until the true user unlocks it.

It should be understood that the particular order in which the operations in FIGS. 8A-8D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein (e.g., methods 500 and 700, and process 600) are also applicable in an analogous manner to method 800 described above with respect to FIGS. 8A-8D.

Figure 9:
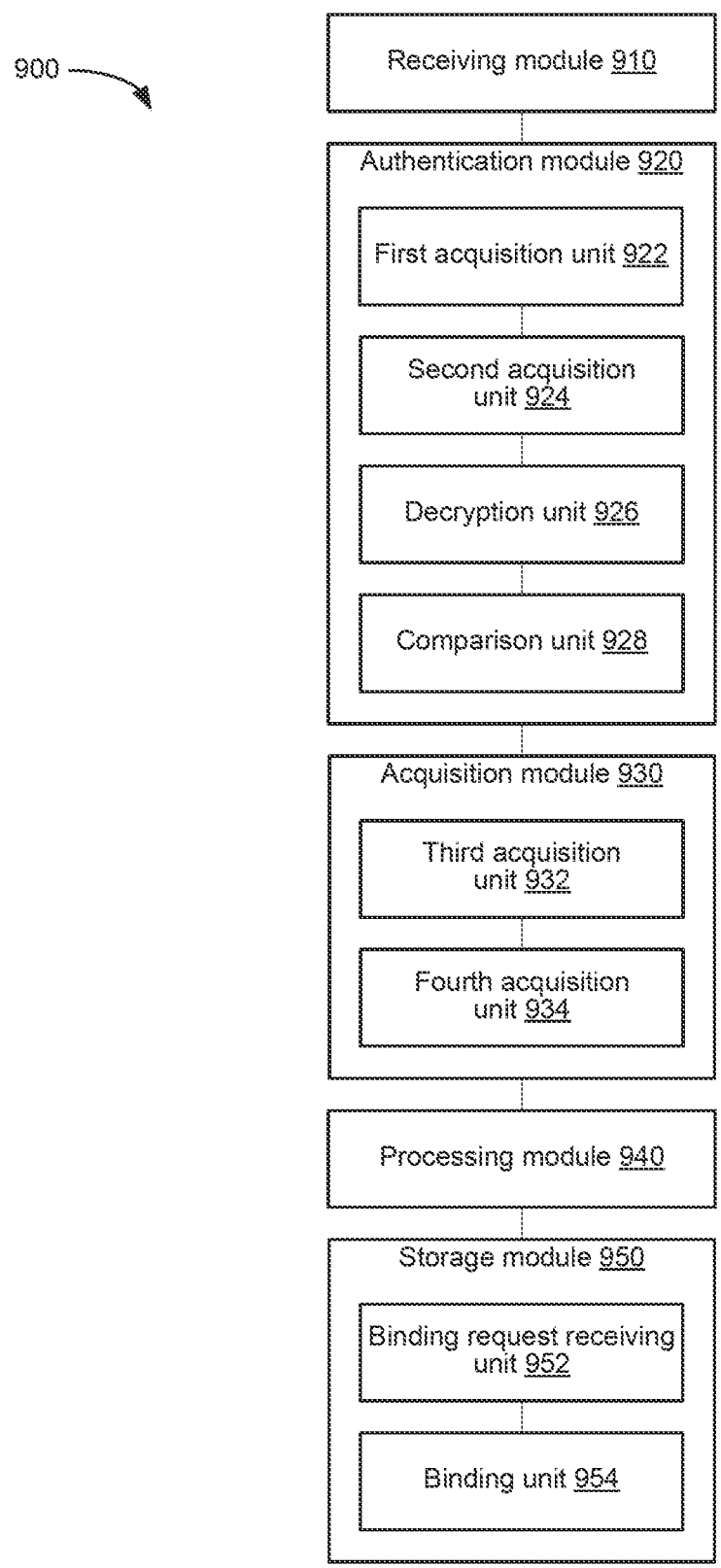
FIG. 9 is a block diagram of a server for processing user resource information in accordance with various embodiments.

FIG. 9 is a block diagram of a server 900 for processing user resource information in accordance with various embodiments. In various embodiments, server 900 may be implemented in whole or in part by software, hardware, or a combination thereof. For example, server 900 corresponds to server system 108 (FIGS. 1-2) or a component thereof (e.g., server-side module 106, FIGS. 1-2). In various embodiments, server 900 includes: a receiving module 910, an authentication module 920, an acquisition module 930, and a processing module 940.

In various embodiments, receiving module 910 is configured to receive a transaction request from a first terminal including transaction information, card identifier information, and card data, where the card identifier information and the card data are acquired by the first terminal from a smart card of a first user.

In various embodiments, authentication module 920 is configured to authenticate the identity of the first user according to the card identifier information and the card data. In various embodiments, authentication module 920 includes a first acquisition unit 922, a second acquisition unit 924, a decryption unit 926, and a comparison unit 928. In various embodiments, first acquisition unit 922 is configured to acquire a stored card data from a stored correspondence between the card identifier information and a user account for the first user bound to the card identifier information. In various embodiments, second acquisition unit 924 is configured to acquire a stored decryption key from the stored correspondence between the card identifier information and a user account for the first user bound to the card identifier information. In various embodiments, decryption unit 926 is configured to decrypt the card data included in the transaction request with the decryption key acquired by second acquisition unit 924 to obtain un-encrypted data. In various embodiments, comparison unit 928 is configured to compare the un-encrypted data obtained by decryption unit 926 with the stored card data acquired by first acquisition unit 922. If the two are the same, the authentication of the identity of the first user succeeds, and if the two are different, the authentication of the identity of the first user fails.

In various embodiments, acquisition module 930 is configured to acquire first user resource information of the first user according to the card identifier information and second user resource information of the second user of the first terminal in accordance with a determination that the authentication by authentication module 920 is successful. In various embodiments, acquisition module 930 includes: a third acquisition unit 932, and a fourth acquisition unit 934. In various embodiments, third acquisition unit 932 is configured to acquire a user account corresponding to the card identifier information. In various embodiments, fourth acquisition unit 934 is configured to acquire acquiring first user resource information of the first user according to the user account acquired by third acquisition unit 932.

In various embodiments, processing module 940 is configured to process the transaction corresponding to the transaction request received by receiving module 910 according to the first user resource information, the second user resource information, and the transaction amount indicated by the transaction information.

In various embodiments, server 900 further includes a storage module 950 for storing an entry in a database to bind the card identifier information with a registered user account. In various embodiments, storage module 950 includes a binding request receiving unit 952 and a binding unit 954. In various embodiments, binding request receiving unit 952 is configured to receive a binding request from a second terminal to bind the card identifier information with a registered user account. In various embodiments, binding unit 954 is configured to bind the card identifier information included in the binding request with the user account identified by the binding request.

Figure 10:
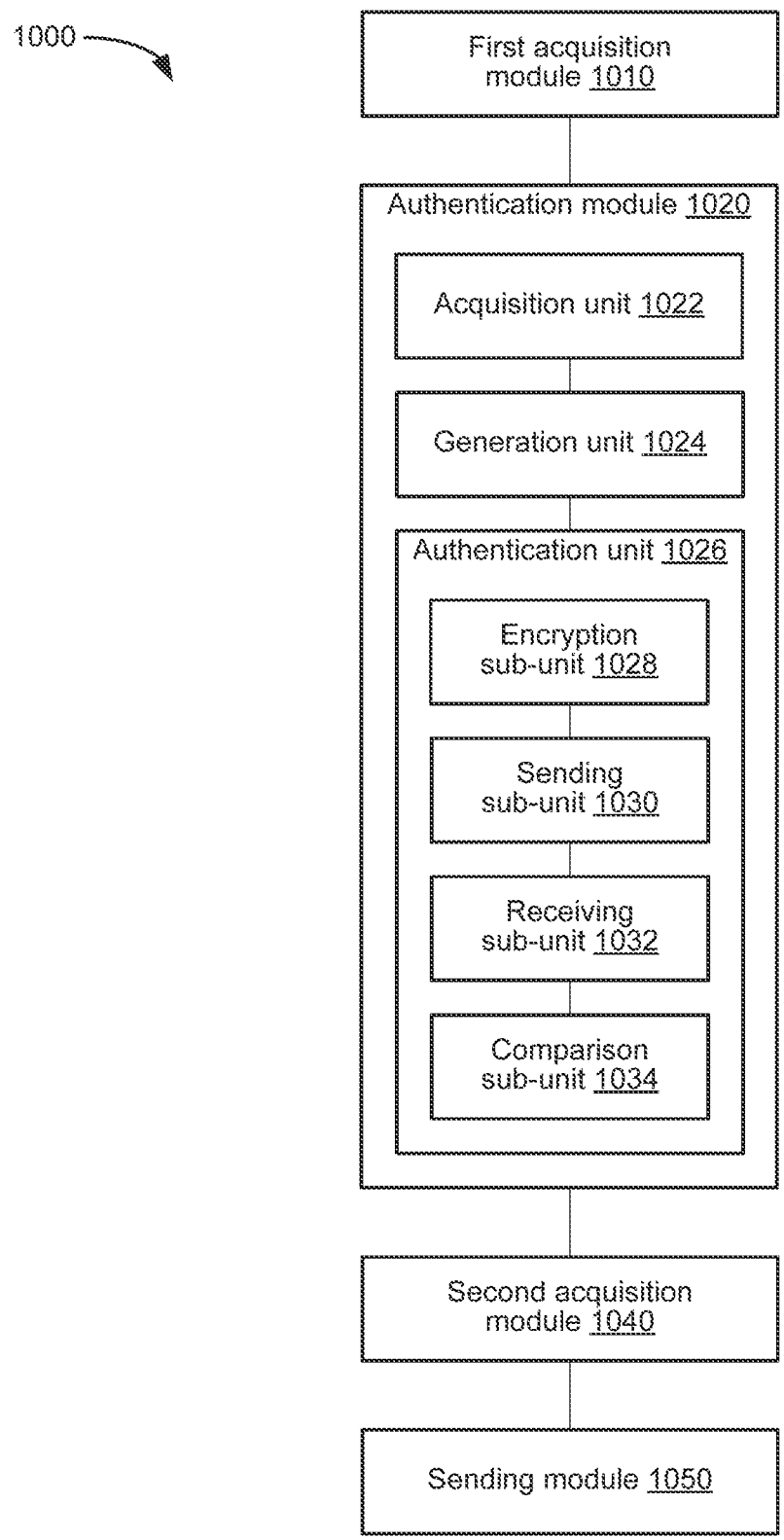
FIG. 10 is a block diagram of a terminal for processing user resource information in accordance with various embodiments.

FIG. 10 is a block diagram of a first terminal 1000 for processing user resource information in accordance with various embodiments. In various embodiments, first terminal 1000 may be implemented in whole or in part by software, hardware, or a combination thereof. For example, first terminal 1000 corresponds to client device 104 (FIGS. 1 and 3) or a component thereof (e.g., client-side module 102, FIGS. 1 and 3). In various embodiments, first terminal 1000 includes a first acquisition module 1010, an authentication module 1020, a second acquisition module 1040, and a sending module 1050.

In various embodiments, first acquisition module 1010 is configured to acquire card identifier information from a smart card. In various embodiments, authentication module 1020 is configured to authenticate the smart card according to the card identifier information. In various embodiments, authentication module 1020 includes an acquisition unit 1022, a generation unit 1024, and an authentication unit 1026. In various embodiments, acquisition unit 1022 is configured to acquire an encryption key corresponding to the smart card from server 900 (FIG. 9) according to the identifier information acquired by first acquisition module 1010. In various embodiments, generation unit 1024 is configured to generate a random number.

In various embodiments, authentication unit 1026 is configured to authenticate the smart card according to the random number generated by generation unit 1024 and the encryption key acquired by acquisition unit 1022. In various embodiments, authentication unit 1026 includes an encryption sub-unit 1028, a sending sub-unit 1030, a receiving sub-unit 1032, and a comparison sub-unit 1034. In various embodiments, encryption sub-unit 1028 is configured to encrypt the random number generated by generation unit 1024 using the encryption key acquired by acquisition unit 1022 to obtain encrypted ciphertext. In various embodiments, sending sub-unit 1030 is configured to send to the smart card the encrypted ciphertext obtained by encryption sub-unit 1028, so that the smart card decrypts the encrypted ciphertext to obtain decrypted data. In various embodiments, receiving sub-unit 1032 is configured to receive decrypted data sent by the smart car. In various embodiments, comparison sub-unit 1034 is configured to compare the decrypted data received by receiving sub-unit 1032 and the random number generated by generation unit 1024. If the two are the same, the authentication of the smart card succeeds, and if the two are different, the authentication of the smart card fails.

In various embodiments, second acquisition module 1040 is configured to acquire card data from the smart card if the authentication by authentication module 1020 succeeds. In various embodiments, sending module 1050 is configured to send a transaction request to server 900 (FIG. 9) including transaction information, the card identifier information, and the card data.

While particular embodiments are described above, they are not intended to limit the application to these particular embodiments. On the contrary, the application includes alternatives, modifications and equivalents that are within the spirit and scope of the appended claims. Numerous details are set forth in order to provide a thorough understanding of the subject matter presented herein. It will be apparent to one of ordinary skill in the art that the subject matter may be practiced without these details. In other instances, well-known methods, procedures, components, and circuits have not been described in detail so as not to unnecessarily obscure aspects of the embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A method for verifying a transaction using a smart card, the method comprising:
    performing, by a device comprising a memory storing instructions and a processor, a first verification process to authenticate a smart card associated with a terminal, the smart card comprising card identification information linked with a user account;
    in response to the first verification process being successful, performing, by the device, a second verification process to authenticate the smart card, the second verification process comprising:
        obtaining, according to the user account, stored un-encrypted card data and a stored decryption key from the memory of the device,
        decrypting, with the stored decryption key, encrypted card data from the terminal,
        determining whether the decrypted encrypted card data matches the stored un-encrypted card data, and
        in response to determining that the decrypted encrypted card data matches the stored un-encrypted card data, authenticating a user of the smart card as an authorized user of the smart card; and
    in response to the first verification and the second verification processes being successful, processing, by the device, a transaction in accordance with transaction information from the terminal.

2. The method of claim 1, further comprising:
    receiving, by the device, a transaction request from the terminal to perform the transaction, the transaction request comprising the card identification information, the encrypted card data, and the transaction information; and
    determining, by the device, the user account linked to the card identification information.

3. The method of claim 2, wherein the processing the transaction in accordance with the transaction information from the terminal further comprises:
processing, by the device, the transaction request according to the transaction information and payment information linked to the user account.

4. The method of claim 2, wherein the performing the first verification process to authenticate the smart card comprises:
generating, by the device, a pseudo-random string, and storing the pseudo-random string in association with the transaction request;
encrypting, by the device, the pseudo-random string with a stored encryption key corresponding to the card identification information, wherein the stored encryption key and the stored decryption key corresponding to the card identification information form an encryption-decryption key pair;
sending, by the device, the encrypted pseudo-random string to the terminal for processing by the smart card;
receiving, by the device from the terminal, a decrypted string corresponding to a decryption process performed by the smart card on the encrypted pseudo-random string with a respective decryption key stored on the smart card; and
comparing, by the device, the decrypted string to the stored pseudo-random string to determine whether the decrypted string and the stored pseudo-random string are identical.

5. The method of claim 1, further comprising:
providing, by the device, updated card data to the smart card, wherein the updated card data is encrypted with a stored encryption key corresponding to the user account.

6. The method of claim 1, further comprising:
in response to the first verification or the second verification processes being unsuccessful, locking-out, by the device, the user account from performing subsequent transactions, and sending a notification to a second device linked to the user account indicating the first verification or the second verification processes being unsuccessful.

7. The method of claim 1, wherein the processing the transaction in accordance with the transaction information from the terminal comprises:
in response to a determination that the transaction information is associated with a security risk, performing a third verification process by:
sending a notification to a second device linked to the user account; and
in response to receiving an authorization message from the second device, processing the transaction in accordance with the transaction information.

8. A device for verifying a transaction using a smart card, the device comprising:
a memory storing instructions; and
a processor in communication with the memory, wherein, when the processor executes the instructions, the processor is configured to cause the device to:
perform a first verification process to authenticate a smart card associated with a terminal, the smart card comprising card identification information linked with a user account,
in response to the first verification process being successful, perform a second verification process to authenticate the smart card, the second verification process comprising:
obtain, according to the user account, stored un-encrypted card data and a stored decryption key from the memory of the device,
decrypt, with the stored decryption key, encrypted card data from the terminal,
determine whether the decrypted encrypted card data matches the stored un-encrypted card data, and
in response to determining that the decrypted encrypted card data matches the stored un-encrypted card data, authenticate a user of the smart card as an authorized user of the smart card, and
in response to the first verification and the second verification processes being successful, process a transaction in accordance with transaction information from the terminal.

9. The device according to claim 8, wherein, when the processor executes the instructions, the processor is further configured to cause the device to:
receive a transaction request from the terminal to perform the transaction, the transaction request comprising the card identification information, the encrypted card data, and the transaction information; and
determine the user account linked to the card identification information.

10. The device according to claim 9, wherein, when the processor is configured to cause the device to process the transaction in accordance with the transaction information from the terminal, the processor is configured to cause the device to:
process the transaction request according to the transaction information and payment information linked to the user account.

11. The device according to claim 9, wherein, when the processor is configured to cause the device to perform the first verification process to authenticate the smart card, the processor is configured to cause the device to:
generate a pseudo-random string, and store the pseudo-random string in association with the transaction request;
encrypt the pseudo-random string with a stored encryption key corresponding to the card identification information, wherein the stored encryption key and the stored decryption key corresponding to the card identification information form an encryption-decryption key pair;
send the encrypted pseudo-random string to the terminal for processing by the smart card;
receive, from the terminal, a decrypted string corresponding to a decryption process performed by the smart card on the encrypted pseudo-random string with a respective decryption key stored on the smart card; and
compare the decrypted string to the stored pseudo-random string to determine whether the decrypted string and the stored pseudo-random string are identical.

12. The device according to claim 8, wherein, when the processor executes the instructions, the processor is further configured to cause the device to:
provide updated card data to the smart card, wherein the updated card data is encrypted with a stored encryption key corresponding to the user account.

13. The device according to claim 8, wherein, when the processor executes the instructions, the processor is further configured to cause the device to:
in response to the first verification or the second verification processes being unsuccessful, lock-out the user account from performing subsequent transactions, and send a notification to a second device linked to the user account indicating the first verification or the second verification processes being unsuccessful.

14. The device according to claim 8, wherein, when the processor is configured to cause the device to process the transaction in accordance with the transaction information from the terminal, the processor is configured to cause the device to:
in response to a determination that the transaction information is associated with a security risk, perform a third verification process by:
sending a notification to a second device linked to the user account; and
in response to receiving an authorization message from the second device, processing the transaction in accordance with the transaction information.

15. A non-transitory computer readable storage medium storing computer readable instructions, wherein, the computer readable instructions, when executed by a processor, are configured to cause the processor to perform:
performing a first verification process to authenticate a smart card associated with a terminal, the smart card comprising card identification information linked with a user account;
in response to the first verification process being successful, performing a second verification process to authenticate the smart card, the second verification process comprising:
obtaining, according to the user account, stored un-encrypted card data and a stored decryption key from a memory in communication with the processor,
decrypting, with the stored decryption key, encrypted card data from the terminal,
determining whether the decrypted encrypted card data matches the stored un-encrypted card data, and
in response to determining that the decrypted encrypted card data matches the stored un-encrypted card data, authenticating a user of the smart card as an authorized user of the smart card; and
in response to the first verification and the second verification processes being successful, processing a transaction in accordance with transaction information from the terminal.

16. The non-transitory computer readable storage medium according to claim 15, wherein, when the computer readable instructions are executed by the processor, the computer readable instructions are further configured to cause the processor to perform:
receiving a transaction request from the terminal to perform the transaction, the transaction request comprising the card identification information, the encrypted card data, and the transaction information; and
determining the user account linked to the card identification information.

17. The non-transitory computer readable storage medium according to claim 16, wherein, when the computer readable instructions are configured to cause the processor to perform processing the transaction in accordance with the transaction information from the terminal, the computer readable instructions are configured to cause the processor to perform:
processing the transaction request according to the transaction information and payment information linked to the user account.

18. The non-transitory computer readable storage medium according to claim 16, wherein, when the computer readable instructions are configured to cause the processor to perform performing the first verification process to authenticate the smart card, the computer readable instructions are configured to cause the processor to perform:
generating a pseudo-random string, and storing the pseudo-random string in association with the transaction request;
encrypting the pseudo-random string with a stored encryption key corresponding to the card identification information, wherein the stored encryption key and the stored decryption key corresponding to the card identification information form an encryption-decryption key pair;
sending the encrypted pseudo-random string to the terminal for processing by the smart card;
receiving, from the terminal, a decrypted string corresponding to a decryption process performed by the smart card on the encrypted pseudo-random string with a respective decryption key stored on the smart card; and
comparing the decrypted string to the stored pseudo-random string to determine whether the decrypted string and the stored pseudo-random string are identical.

19. The non-transitory computer readable storage medium according to claim 15, wherein, when the computer readable instructions are executed by the processor, the computer readable instructions are further configured to cause the processor to perform:
providing updated card data to the smart card, wherein the updated card data is encrypted with a stored encryption key corresponding to the user account.

20. The non-transitory computer readable storage medium according to claim 15, wherein, when the computer readable instructions are executed by the processor, the computer readable instructions are further configured to cause the processor to perform:
in response to the first verification or the second verification processes being unsuccessful, locking-out the user account from performing subsequent transactions, and sending a notification to a second device linked to the user account indicating the first verification or the second verification processes being unsuccessful.

* * * * *